March 11, 1952     E. W. FLINT ET AL     2,588,375
AUTOMATIC ACCOUNTING DEVICE
Filed June 24, 1949     15 Sheets-Sheet 1
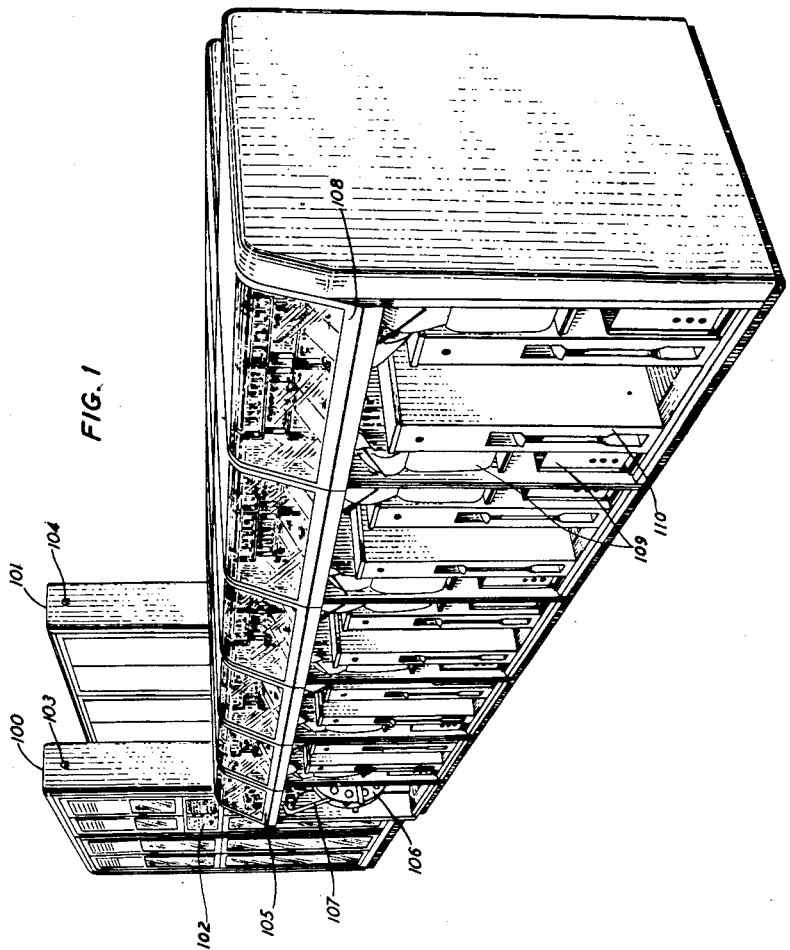
INVENTORS E. W. FLINT
A. E. HAGUE
A. E. JOEL, JR.
R. O. RIPPERE
BY
ATTORNEY March 11, 1952
E. W. FLINT ET AL
2,588,375
AUTOMATIC ACCOUNTING DEVICE
Filed June 24, 1949
15 Sheets-Sheet 2
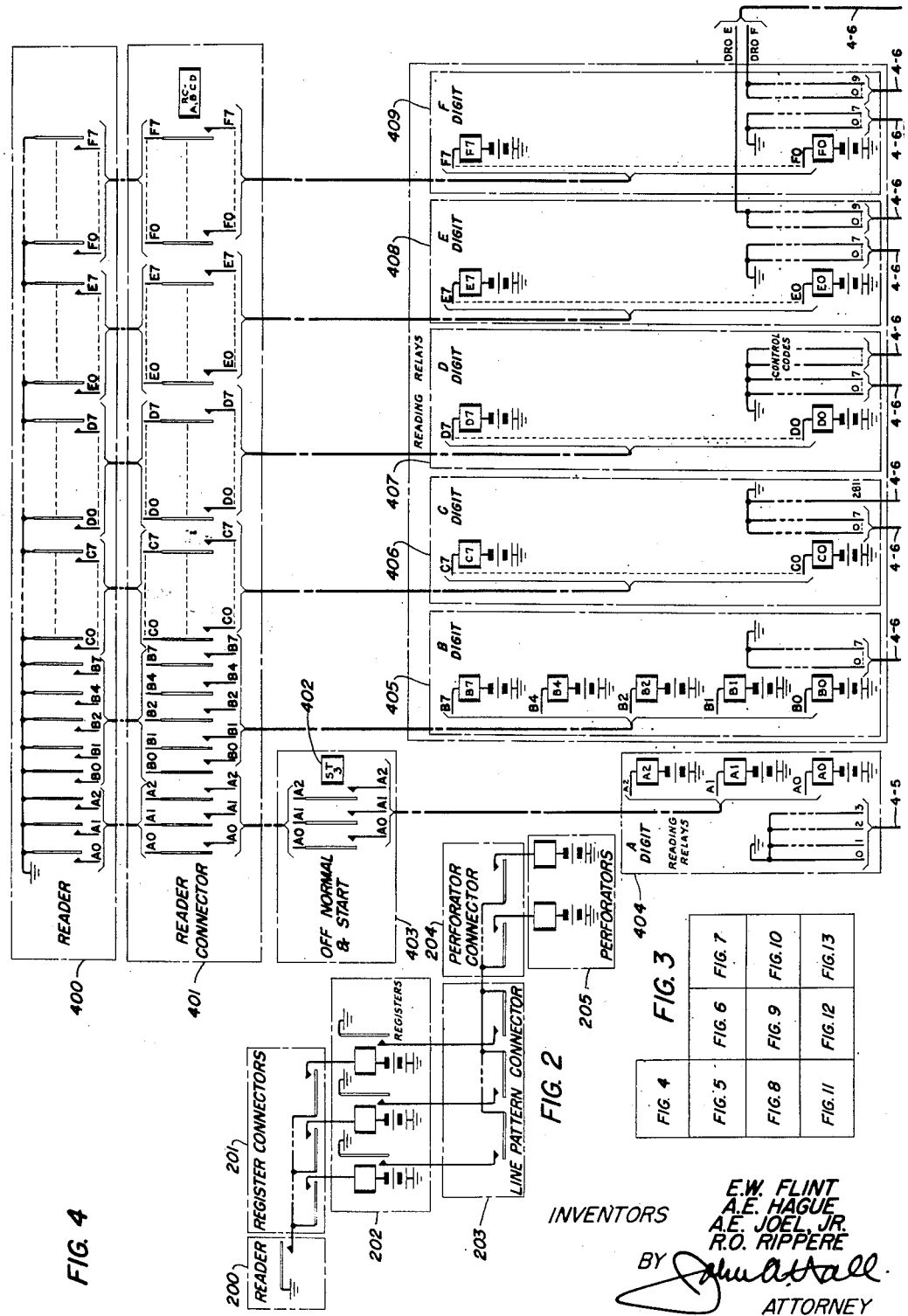
INVENTORS
E.W. FLINT
A.E. HAGUE
A.E. JOEL, JR.
R.O. RIPPERE
BY
ATTORNEY March 11, 1952

E. W. FLINT ET AL 2,588,375

AUTOMATIC ACCOUNTING DEVICE

Filed June 24, 1949

INVENTORS
E.W. FLINT
A.E. HAGUE
A.E. JOEL, JR.
R.O. RIPPERE

BY John A. Hall
ATTORNEY

INVENTORS
E.W. FLINT
A.E. HAGUE
A.E. JOEL, JR.
R.O. RIPPERE

BY
ATTORNEY

INVENTORS
E.W. FLINT
A.E. HAGUE
A.E. JOEL, JR.
R.O. RIPPERE
BY
ATTORNEY

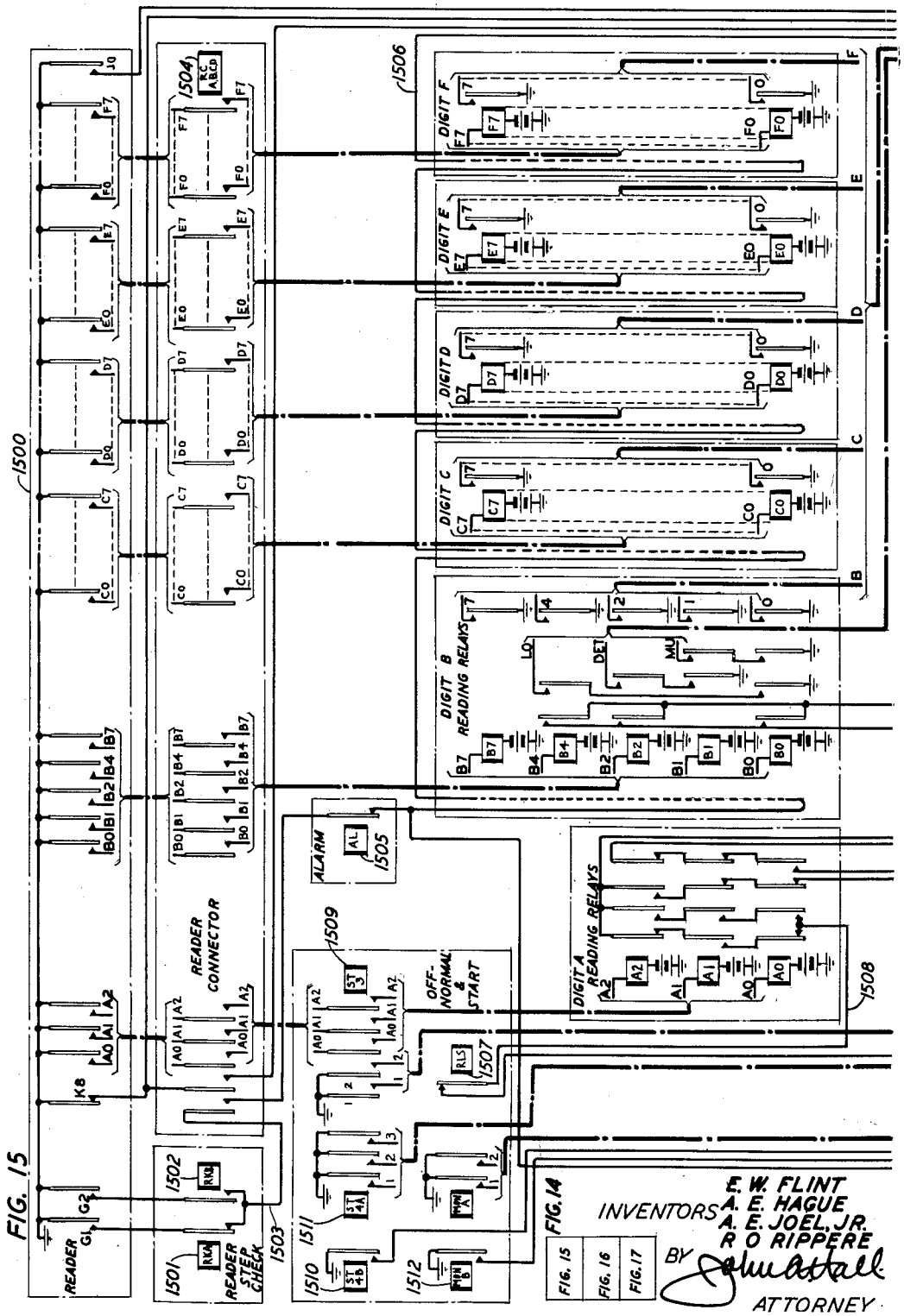

INVENTORS
E. W. FLINT
A. E. HAGUE
A. E. JOEL, JR.
R. O. RIPPERE

ATTORNEY

March 11, 1952  E. W. FLINT ET AL  2,588,375
AUTOMATIC ACCOUNTING DEVICE
Filed June 24, 1949  15 Sheets-Sheet 14

INVENTORS
E. W. FLINT
A. E. HAGUE
A. E. JOEL, JR.
R. O. RIPPERE
BY
ATTORNEY

INVENTORS
E. W. FLINT
A. E. HAGUE
A. E. JOEL, JR.
R. O. RIPPERE

ATTORNEY

Patented Mar. 11, 1952

2,588,375

UNITED STATES PATENT OFFICE 2,588,375

AUTOMATIC ACCOUNTING DEVICE

Erlon W. Flint, Mountain View, and Alfred E. Hague, West Orange, N. J., and Amos E. Joel, Jr., New York, and Robert O. Rippere, Massapequa, N. Y., assignors to Bell Telephone Laboratories, Incorporated, New York, N. Y., a corporation of New York Application June 24, 1949, Serial No. 101,084

7 Claims. (Cl. 235—61.6)

This invention relates to automatic accounting systems and particularly to systems wherein records automatically produced by and of customer uses of given facilities over variable time periods are processed by electrical devices in a number of steps to produce customer bills for the services rendered.

The object of the invention is to provide means for collecting and correlating data scattered through one or more record tapes or equivalent media, to calculate the charges to be made and to translate the collected and correlated data into a form required for printing.

The present invention is exemplified herein in a plurality of circuit details of one of the electrical devices employed for one step in an automatic accounting process, that device known as the computer. This device, like the other devices employed, is arranged to take records from an incoming or old perforated tape, to modify the records in accordance with the purposes for which it is adapted and to produce a plurality of outgoing or new perforated tapes therefrom.

The original tape, automatically produced by customer use of given facilities contains scattered items of specific information, such as the initial entry, the answer or start time and the disconnect or termination time for each customer use and other items of general information, such as the general location of the using customer's facilities, the date, the hours and the identity of the billing period. This tape in a specific arrangement of an accounting system is employed as an incoming tape in a device known as an assembler, which collects or assembles the various and scattered items of specific information.

The next step in the accounting process is performed in the computer which takes the assembled items of specific information, calculates therefrom elapsed time, modifies the result in accordance with a billing index which indicates the rate of charges, translates this result into a number of unit charges (message units in an automatic message accounting system) and distributes the calculated charges along with accompanying details to one or another of a plurality of outgoing tapes.

In a specific embodiment of the invention the computer is provided with a reader for entering data from an incoming tape into its calculator and registers and nineteen perforators for distributing the processed data to nineteen outgoing tapes. There will be ten of such perforators assigned to the recording of message unit charges. If the tape is from a marker group serving more than one office, then as many of these perforators as there are offices will be used so that a separate outgoing tape for each office will be prepared. If the marker group contains but a single office then the charges will be sorted on a decimal basis either in accordance with the thousands digit of the called line number or in accordance with the units digit thereof. There will be six of such perforators assigned to the recording of detail calls, that is calls, the details of which will be reported on the customers' bills. Since the central office tapes are recorded by "rounds" and since the longest round provided for will consist of six days, then six perforators are provided so that the detail calls may be sorted by days. There will be one perforator assigned to the recording of irregular calls such as straddle calls or those occasional calls which exceed the capacity of the device such as those extending over a period of time greater than ninety-nine minutes. There will be one perforator assigned to the recording of the details of message unit calls where these details are sought for monitoring or other purposes by the customer. The customer's bill will nevertheless be rendered on the message unit basis so that a particular message unit call will be processed by the computer and two records produced therefrom, one in short form on one of the regular message unit tapes for billing purposes and another in longer form on the message unit detail record tape for supervisory purposes. And lastly there will be one perforator assigned to record the line observed calls, that is, a record made of all calls originated on certain lines put under observation under routine or on account of customer complaints.

The first seventeen output tapes including the ten message unit tapes, the six detail call tapes and the irregular call tape will contain billing information whereas the last two, the message unit detail call and the line observed call tapes will contain reference information. The distribution of calls to these nineteen outgoing channels is a function of the computer and in most cases is controlled by some index in the initial entry of each call, but may in other cases be controlled by extraordinary conditions derived or detected by the computer itself, as when the elapsed time calculated exceeds two digits (99 minutes). Thus, the computer translates, calculates, computes, sorts and otherwise rearranges the items of information found on an incoming tape to form a plurality of outgoing tapes carrying the thus processed information in another form.

By way of illustration, a number of examples of assembled call information as they appear on the incoming tape and as they are transformed for perforation on one or another of the outgoing tapes are given with a short explanation of certain features of the transformation.

(1) A message unit call entered as:

135246
131746
213046
005444 which is a call made from office 0 of the given marker group (identified in the tape identity entries) from calling line 5444, and extending from 31.7 minutes to 35.2 minutes. The billing index (3), we will assume will cause the calculation of 3.5 minutes of elapsed time to indicate 2 message units, so that the computer will form and cause to be perforated on the number 5 perforator (thousands digit of calling line number, assuming a single office in the given marker group) the following output line:

125444

(2) A message unit call entered as:

135237
117537
214037
031234 which is a call from office 3 of the given marker group (identified in the tape identity entries) from calling line 1234 and extending from 17.5 minutes to 35.2 minutes. The billing index (4) we will assume will cause the calculation of 18.7 minutes of elapsed time to indicate 12 message units so that the computer will form and cause to be perforated on the number 3 perforator (sorted by office when the marker group contains more than one office) two output lines:

201234
000012

(3) A message unit call entered as:

101673
281021
156273
213073
005444 is one very similar to Example No. 1 except that it also includes an hour entry. The elapsed time is calculated as follows:

+01.6
+60.0
−56.2
―――
+ 5.4

If this in combination with the billing index indicates 3 message unit calls then the output will be:

135444

(4) A message unit call might appear as:

101652
281899
156252
213052
005444

The second line in this case is known as an irregular hour entry and while it does not show the actual hour it nevertheless sets the hour circuit back an hour so that the calculation is identical with Example No. 3 and the output line will be:

135444

(5) Should a call appear as follows:

101657
281021
281020
156257
213057
005444 then the calculation of elapsed time would be as follows:

+ 01.6
+120.0
− 56.2
―――
+ 65.4

Assuming that this elapsed time will indicate 27 message units, the output becomes:

235444
000027

(6) If the line 5444 of Example No. 1 were under observation, then the input to the computer would be as follows:

135246
131746
243046
005444
051133
010000

The entry index (the B digit of the first line of the initial entry) is 4 instead of 1 as in the first example, and two supplementary lines giving details of the called number are added. In this case the computer forms and causes to be perforated on the number 5 perforator, as before, the output line:

125444

This is billing information and will eventually be the data from which the customer's bill is made up.

In addition the computer forms and causes to be perforated on the line observation tape the following:

105444
062511
051133
010000
000402

This is supervisory information and is not used in forming bills but goes to company officials for various purposes such as routine checking, or for answering complaints, etc. The second line is formed by a translator from an assumed date (15th), hour (21) and answer time (31). The third and fourth lines are copies of the last two lines of the assembled call and the last line has a record of the message unit index (0), the chargeable time (04—rounded off from 3.5) and the number of message units charged (02).

(7) In example No. 6 if the third line had been 233046 instead of 243046 then a message unit detail call is indicated. In such case the output line will be 125444 as before and the five-line detail information record will be exactly the same except that it will be perforated on the message unit detail tape instead of the line observing tape and will eventually go to the customer for his information.

(8) A detail call read from the incoming tape as:

```
135213
131713
239013
005444
051133
010000
``` will be processed and distributed to the detail call output tape as:

```
105444
062511
051133
010000
000400
```

The first line of this output gives the calling line number. The second line is the start time line which is synthesized from the day (15), the hour (21) and minutes (31). The third and fourth lines are copies of the last two lines of the call as entered and the last line shows the chargeable time as 04 minutes. Note the difference between this and Example No. 6 where the number of message units (02) appeared as the last two digits of the last line. In the present case the message billing index (9) in the third line 239013 of the entries read from the incoming tape is a means which causes the last two digits of the last line of the processed call perforated on the detail call tape to be blanked out as 00.

(9) With a very slight difference, the digit 4 instead of the digit 3 as the B (or second) digit of the first line of the initial entry as:

```
135213
131713
249013
005444
051133
010000
``` the following record:

```
105444
062511
051133
010000
000400
``` will be perforated in both the line observing output tape and the detail call tape.

There are many variations of the above described patterns to take car of operating contingencies which need not be herein described in detail. One of the important circuits of the computer but which in fact gets less use than others is the so-called straddle circuit for taking care of a variety of irregular calls and which are mainly recorded so that an operator or clerk may investigate the irregular circumstances and prepare a bill by hand.

In general, the computer consists of a plurality of registers into which both items of specific information and items of general information may be entered, a calculator, steering means, line forming pattern means and distributing means. Specific details of a call are entered, the elapsed time is calculated and this is weighted, rounded off and converted into charges, either chargeable time or a number of message units.

Again, generally the first items of information entered in the computer are the recorder number, the hour and the day and these are registered before any specific problem is presented for calculation and remain registered until a complete group (for a single call identity index) of calls has been processed. During the processing of this group the hour and the day registrations are changed from time to time by the occurrence of an hour entry found amoung the scattered items of specific information.

The first of the specific items of information to be registered are the two items fixing the start and end of the customer use of the facilities and from these the calculator derives the elapsed time and transmits this to an elapsed time register where it is held under control of an ouput control circuit. Generally the elapsed time may be calculated and registered before the initial entry giving other details of the customer use can be completely registered and the output lines formed and transmitted. To save time, an overlapping arrangement is employed, whereby after a calculation has been made and the elapsed time has been transferred to the elapsed time register but before the computer has transmitted the patterned lines to an output tape, the time element lines of the next call are entered in the calculator.

After the complete information has been registered in the computer the output control will cause the selection of a particular output channel and will transmit thereto the patterned lines such as those explained hereinabove.

A feature of the invention is an overlapping arrangement. In the normal operation of the computer the sequence of events is as follows. First, the disconnect time is entered in the calculator, next, the answer time is entered and finally, the initial entry is entered. However, the calculator starts to work as soon as the answer time is entered and the calculation is completed and the result is registered before the entry of the initial entry is completed. Therefore, as soon as the calculation has been completed and the calculator has been cleared the calculation of the next call may be started. Hence, the entry of the disconnect time and the answer time for the next call may proceed even before the final disposition of the previous call has been completed whereby a saving in time may be made.

The above-noted feature is extended by means for preventing the start of the overlapping operation in the case of detail calls in order to be sure that the proper number of supplementary lines of an initial entry have been registered. In such detail calls the initial entry consists of one initial line and three supplementary lines, each of which have a characteristic line index. Therefore, the entry of items of a new call is prevented so long as lines having this particular and characteristic line index are being entered. Under normal conditions, therefore, as soon as some other line index appears, the entry of the next call will start. Under abnormal conditions, however, where certain extraordinary arrangements have to be made, this start is delayed until proper disposition of the faulty call can be made. Such an abnormal condition, by way of example, may be an attempt to register an extra supplementary line in an initial entry.

Thus, a delaying means is provided for holding up the normal operation of the overlapping means, which is enabled at a given point in the sequence of operations. However, in the case of calls other than those in which details must be reported it is not necessary to delay the operation of the overlapping means and hence the effectiveness of the delaying means is placed under control of a signal which characterizes the call as a detail call.

A feature of the invention may, therefore, be stated as a means for causing overlapping of the sequential operations of a device enabled by advance to a given point in the sequence but delayed in operation by a checking means responsive to a predetermined further advance in said sequence, together with means responsive to a characteristic signal for rendering said delaying means effective.

Another feature of the invention is a means for terminating an operation at an earlier than normal time under given circumstances in order to expedite other operations. The so-called straddle circuit has general supervisory functions in that it constantly watches over the progress of the operations in the computer and is ready to take charge to divert the output to the straddle tape for the purposes of recording all details of a call which is irregular. One of the circumstances under which the straddle circuit acts is when the computer elapsed time exceeds 99 minutes or when the number of message units into which the computed elapsed time is converted exceeds ninety-nine message units, that is, when either figure reaches a point where it will have to be expressed in more than two digits. Since only two digital places are provided for the representation of these figures, it is evident that the details from which these values were derived must be recorded so that such a (rare) call can be computed by an attendant and that, therefore, such details must be recorded on the straddle tape.

However, since the calculation of the elapsed time is one of the earliest operations in the computer, a short call means is provided which is responsive to a calculated elapsed time of less than 99 minutes and of a given value or under, which in combination with the highest rate billing index will not figure to more than ninety-nine message units for immediately relieving the straddle circuit of its supervisory functions in this connection. If it thus appears that the registration of the answer and disconnect time will not be needed for recording on a straddle tape, the registers in which these values are held may be released as soon as the elapsed time is calculated and prior to the final determination of the number of message units, whereby the overlap operation may be advanced. Time is saved in this manner.

A feature of the invention may, therefore, be stated as a means responsive to the result of a calculation when it falls within a given range for causing a circuit operation which would otherwise await a further and dependent operation. Otherwise stated, this feature resides in the use of a short call relay for speeding up time-consuming operations in response to an indication that when certain operations are eventually concluded the result must necessarily be within a given range.

Another feature of the invention is a check circuit in the form of a pair of relays each carrying a large number of contacts and which operate together so as to virtually constitute a great multicontact relay. It is often a matter of economy to use several relays of a type readily available with their windings multipled to simulate a multicontact relay of a non-existent or of a very expensive type. In the present device there will be found many instances of such use of several relays all operating together and controlling a plurality of circuits which are shown in the drawings as a single multicontact relay. In the present instance it is so important that all the contacts operated by the plurality of relays be closed that special means have been provided to make certain that each of the relays constituting the multicontact relay have operated, in other words, to assure that the whole is operated by checking the operation of each and every part. Consequently, each part is operated from a separate source and each part thereafter controls the locking or continued operation of another part. Thus, if there are two relays A and B constituting a single relay in effect, the relay A provides the locking path for the relay B and in similar manner the relay B provides the locking path for the relay A. Consequently, if either should fail both (or where this principle is extended to a greater plurality of parts, all the others) will be released.

Other features will appear hereinafter.

The drawings consist of fifteen sheets having eighteen figures as follows:

Fig. 1 is a perspective view of the racks and cabinets in which the device of the present invention is housed and is intended to give a general view of the device;

Fig. 2 is a highly schematic showing of the basic switching circuit employed herein;

Fig. 3 is a block diagram showing how Figs. 4 to 13, inclusive, may be placed to form a more detailed but yet a schematic-like use of the elements of the present invention and in which:

Fig. 4 shows the reader and the reading relays by which the input tape is scanned;

Figure 5:
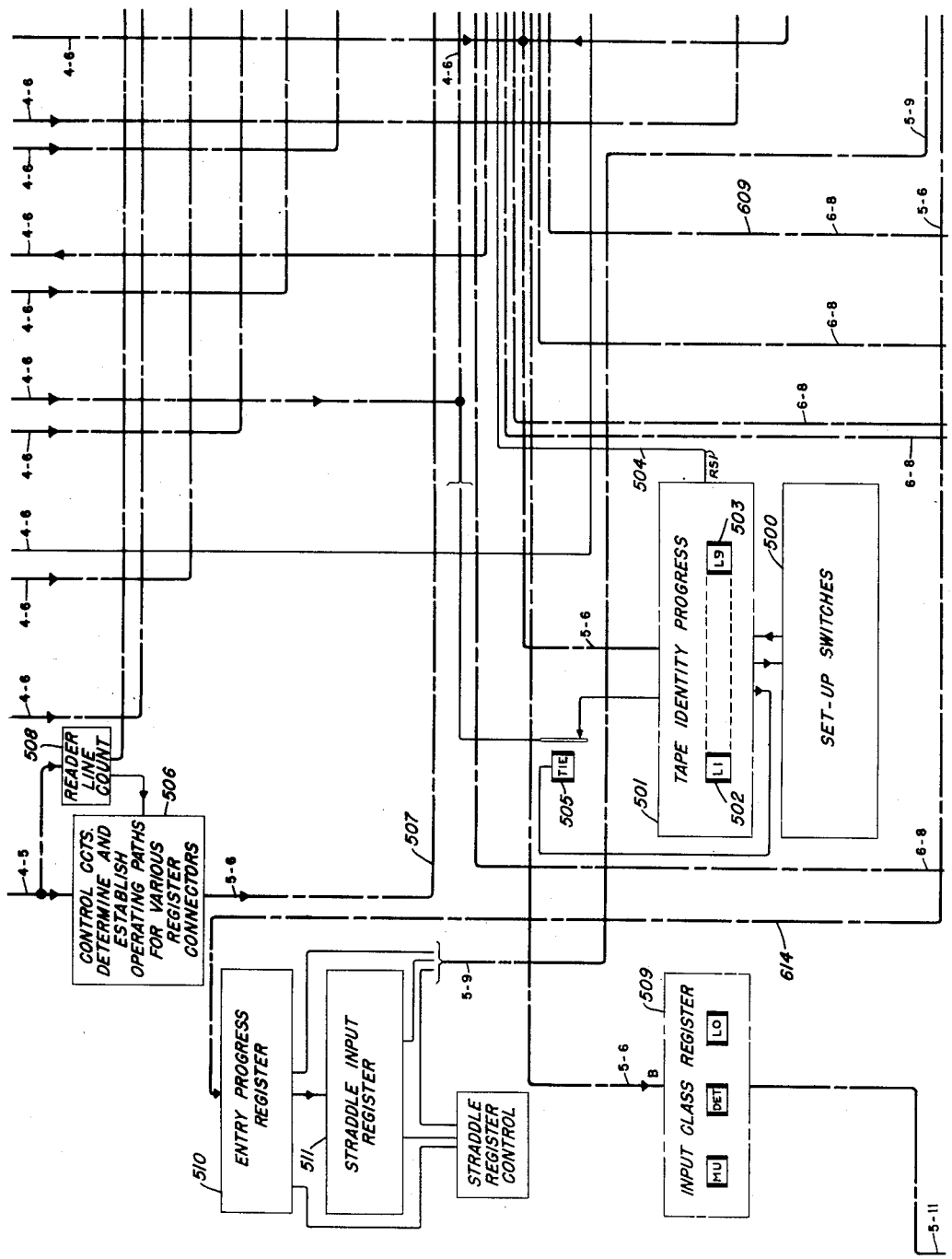
Figure 6:
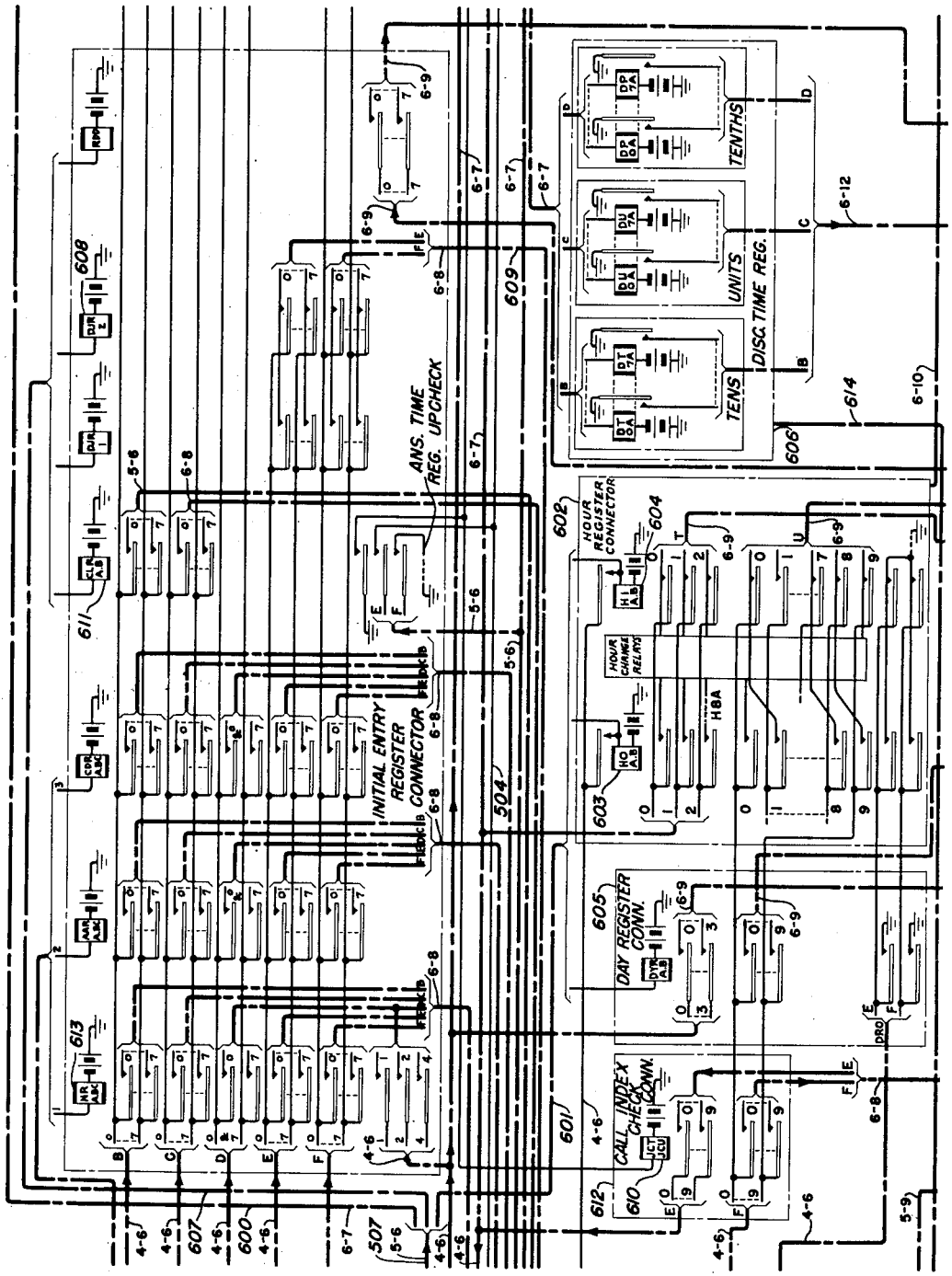
Figure 7:
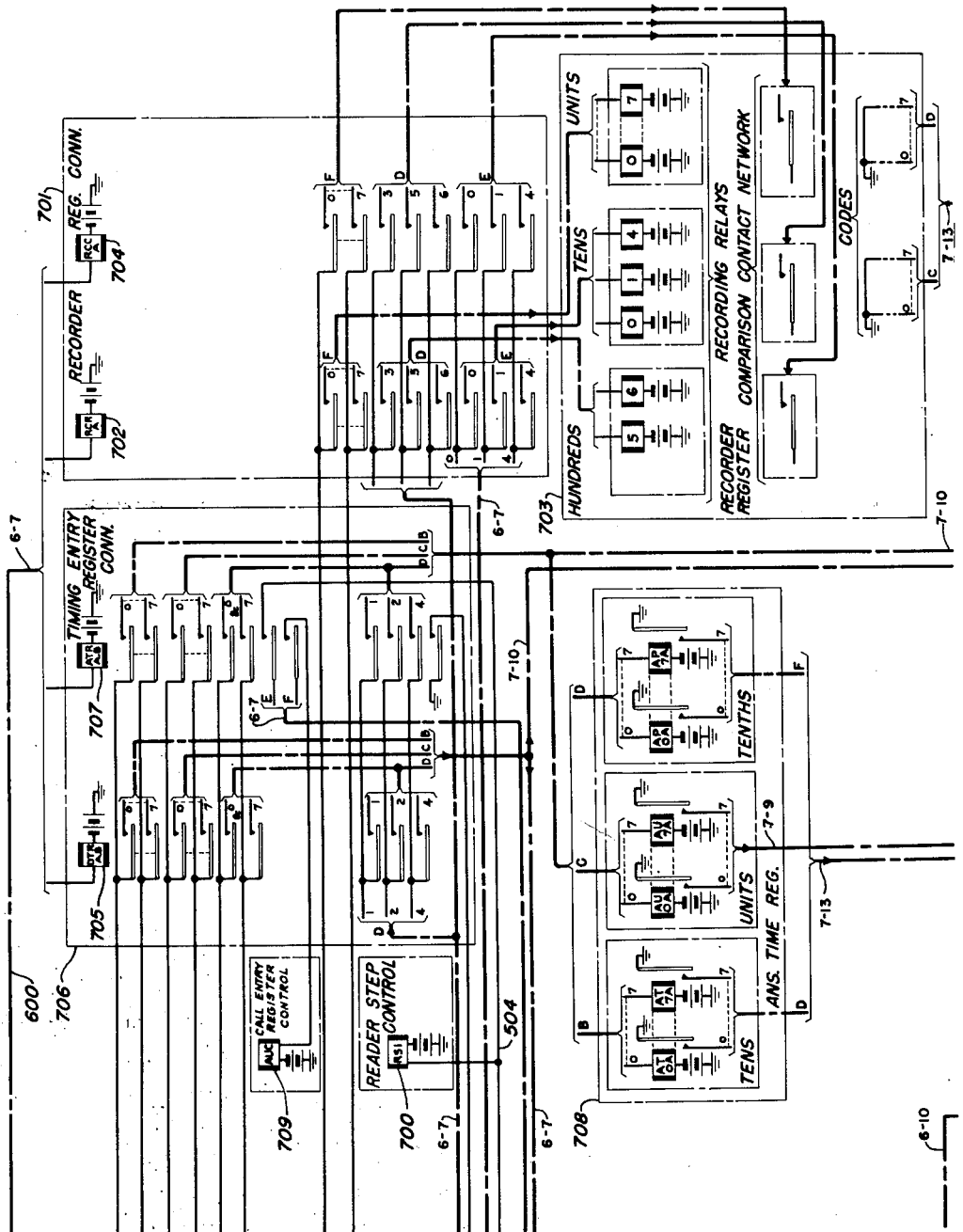
Figure 8:
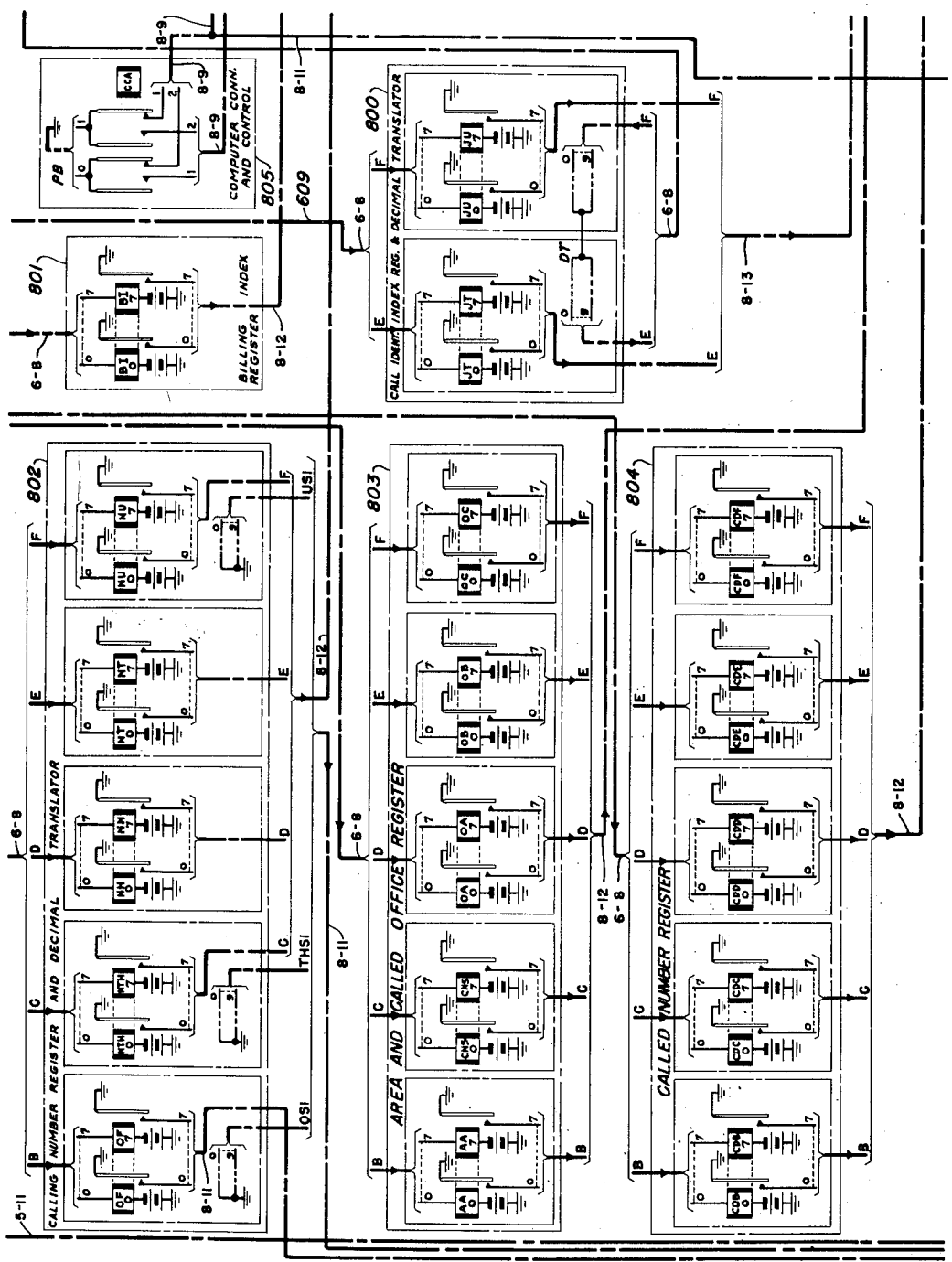
Figure 9:
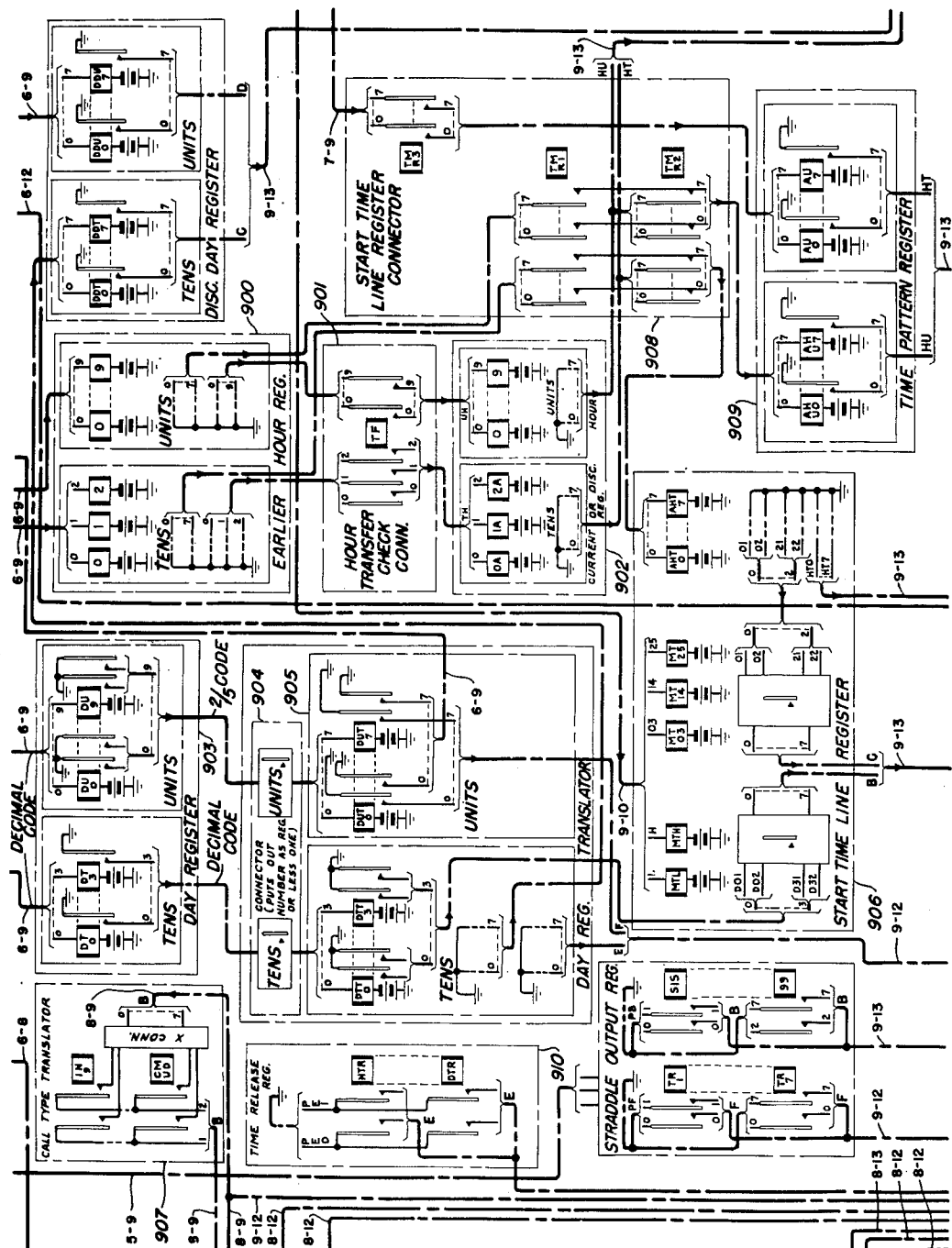
Figure 10:
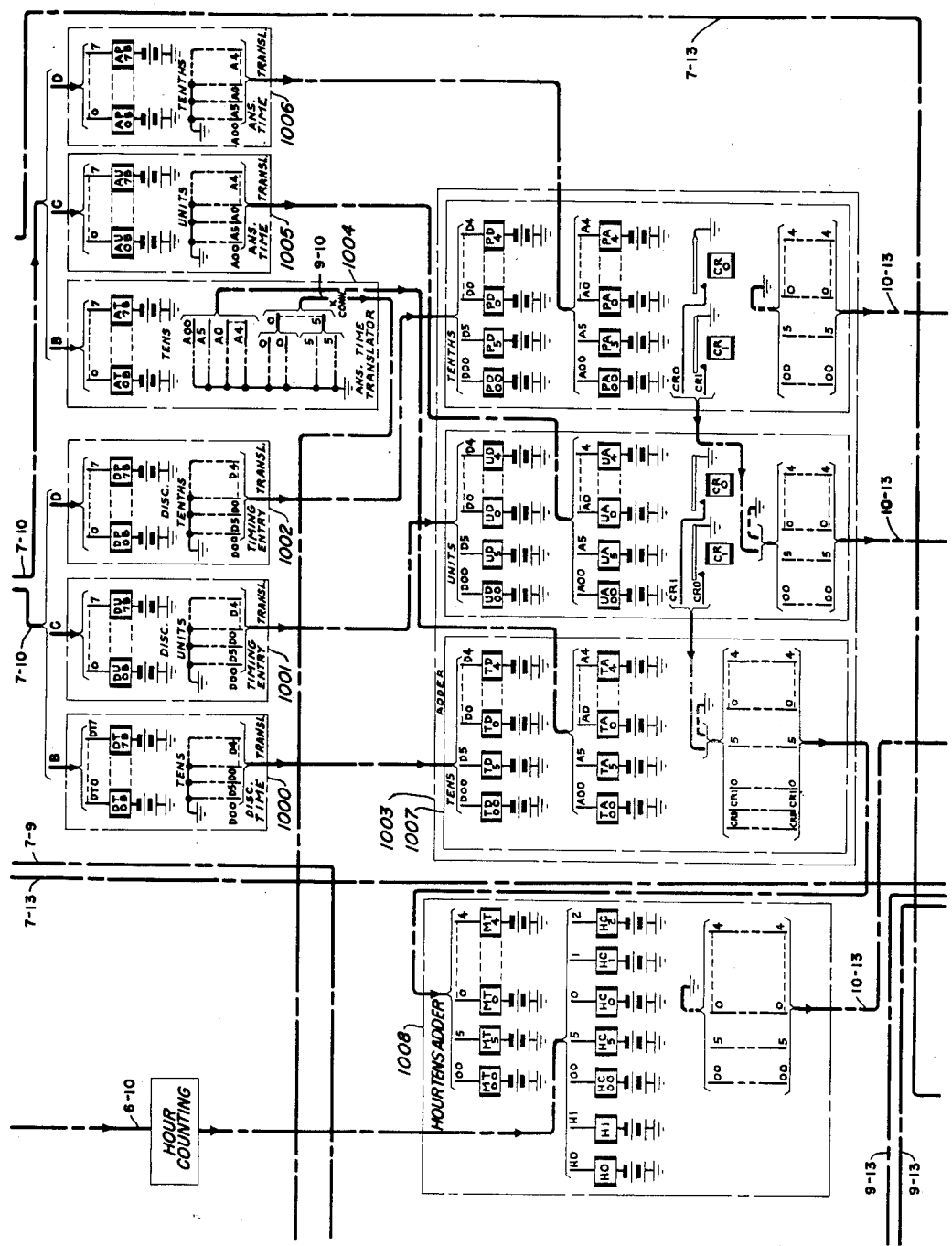
Figure 11:
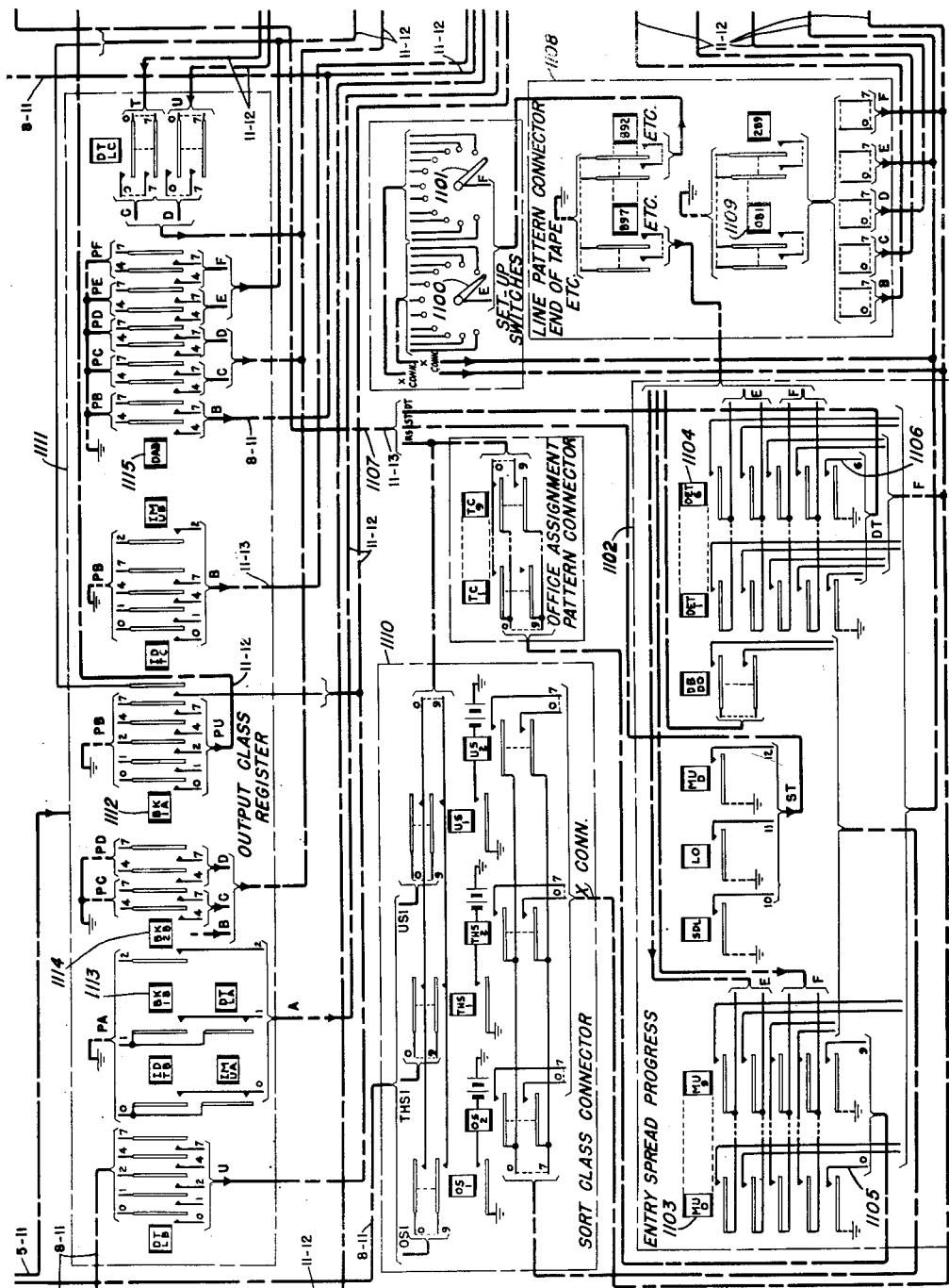
Figure 12:
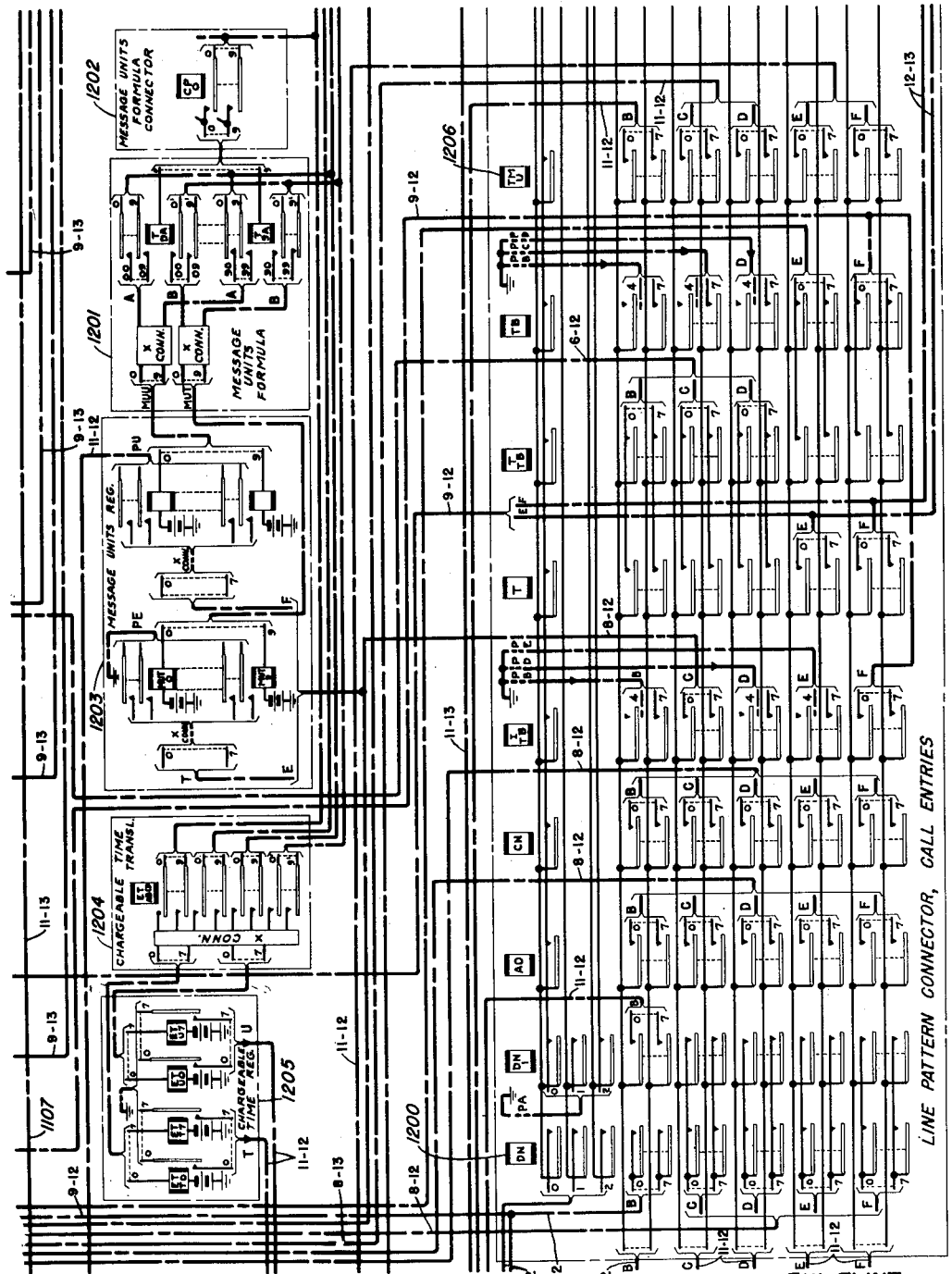
Figure 13:
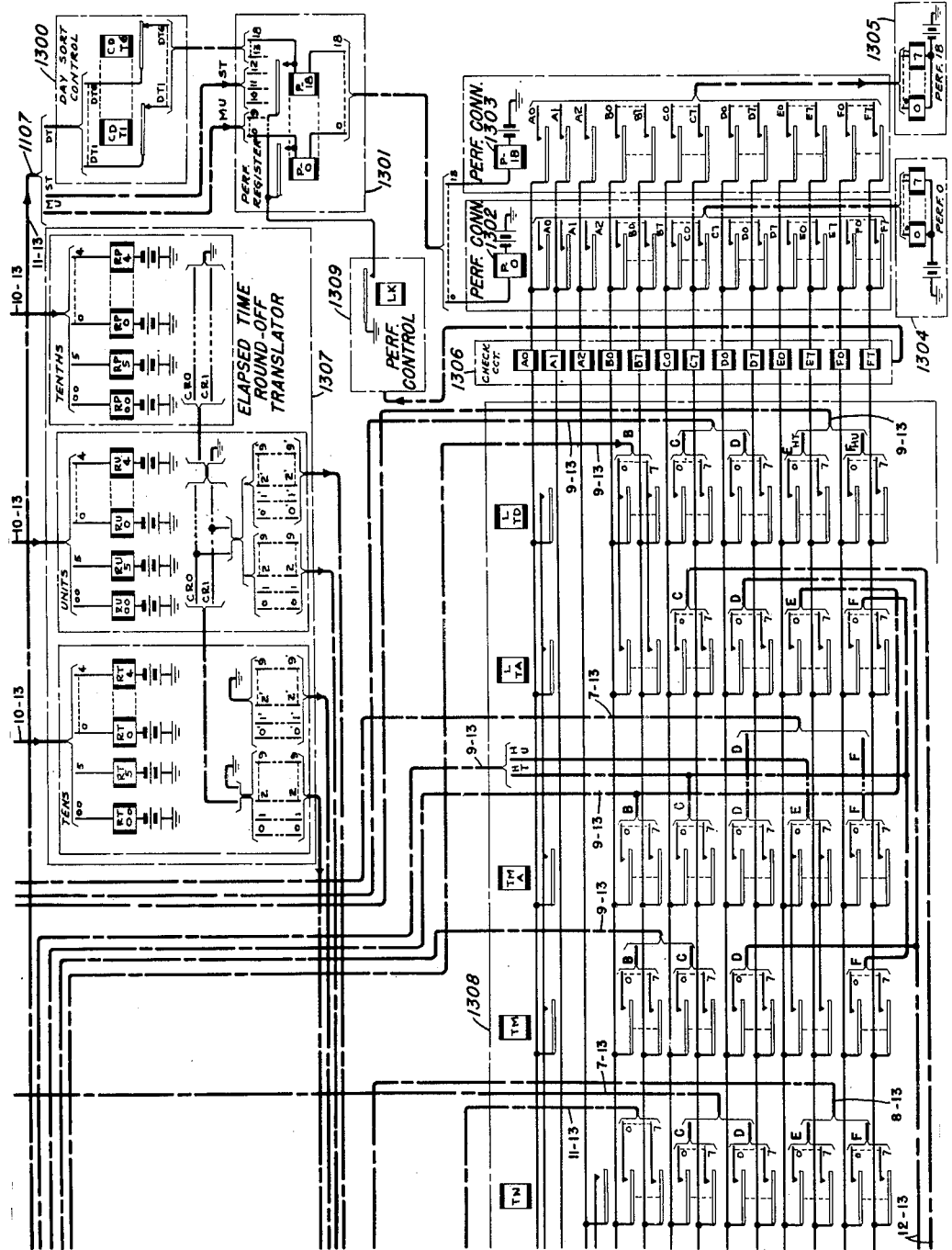

Fig. 5 indicates the location in the circuit arrangement of the reader line count means, the reading relay translator and the control circuits;

Fig. 6 shows a number of register connectors and indicates the disconnect time register;

Fig. 7 likewise shows a number of register connectors and indicates the answer time and the recorder register;

Fig. 8 shows the calling number register, the area and called office register, the called number register, the billing index register and the day and junctor register and decimal translator;

Fig. 9 shows the call type translator, the day register, the time release register, the day register translator, the straddle output register, the start time line register, the earlier hour register, the hour transfer check connector, the disconnect register, the disconnect day register, the start time line register connector and the time pattern register;

Fig. 10 shows the adder that part of the computer which performs the mathematical functions thereof;

Fig. 11 shows the output class register, the sort class connector, the entry spread progress circuit, the office assignment pattern connector, the set-up switches and the line pattern connector for the end of tape perforation;

Fig. 12 shows the chargeable time register, the chargeable time translator, the message units register, the message units formula device, the message units formula connector and the line pattern connector for call entries; and Fig. 13 shows the elapsed time translator, the day sort control, the perforator register, the perforator control, part of the line pattern connector for call entries, the check circuit therefor and indicates two of a plurality of perforator connectors and the associated perforators;

Fig. 14 is a block diagram showing how Figs.

15, 16 and 17 may be placed to form a schematic circuit diagram illustrating the features of the present invention.

Figure 16:
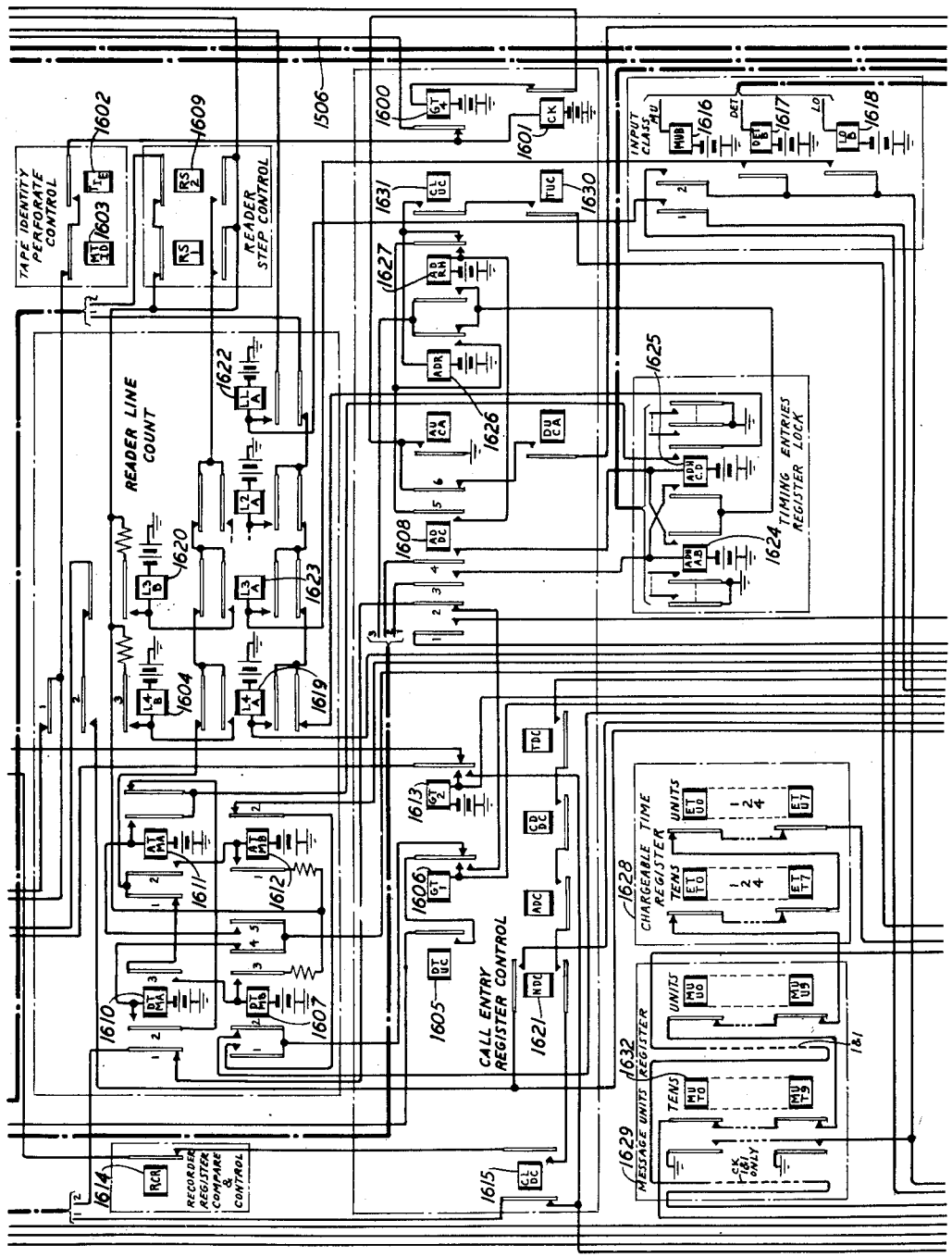
Figure 17:
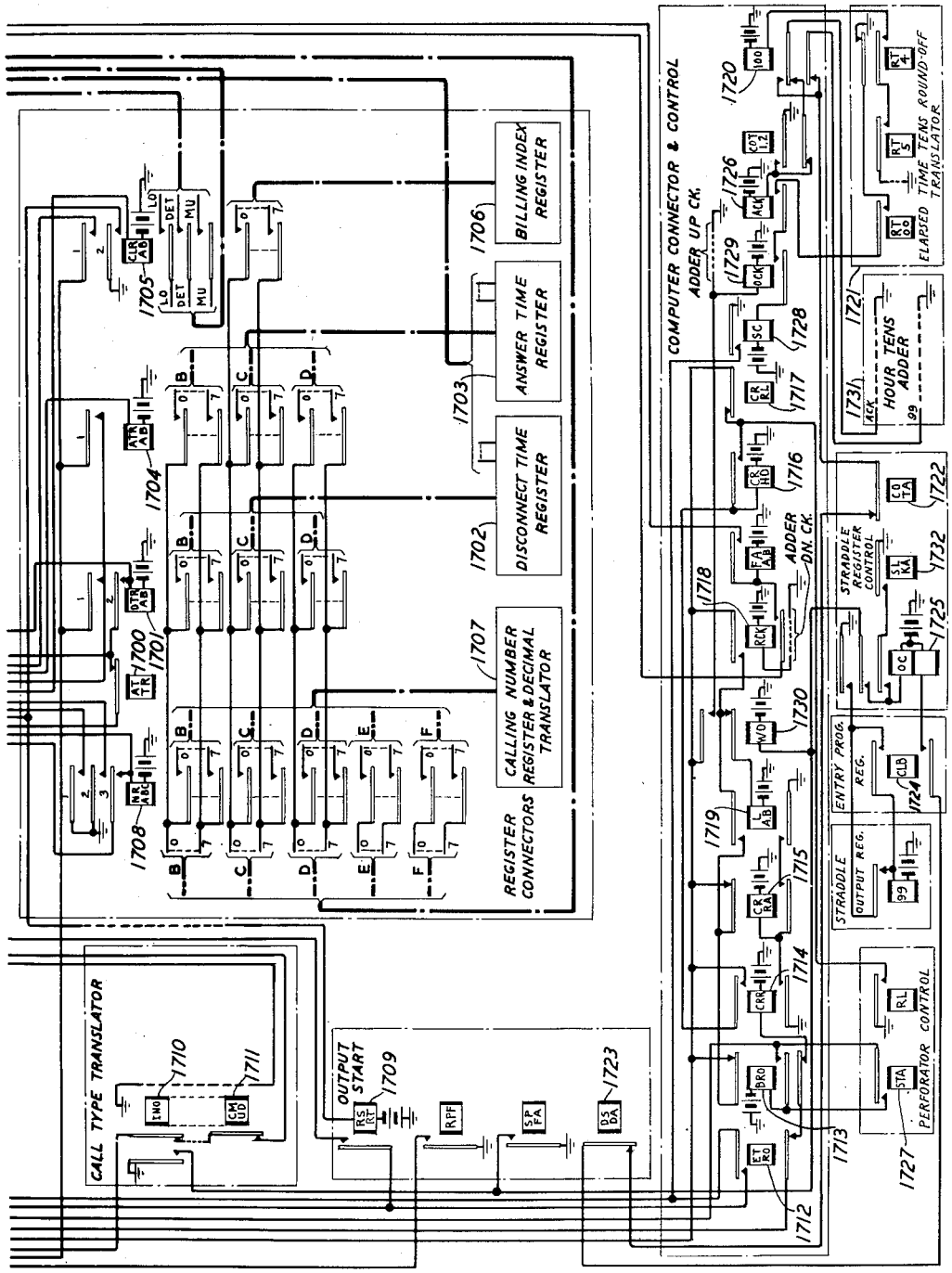
Figure 18:
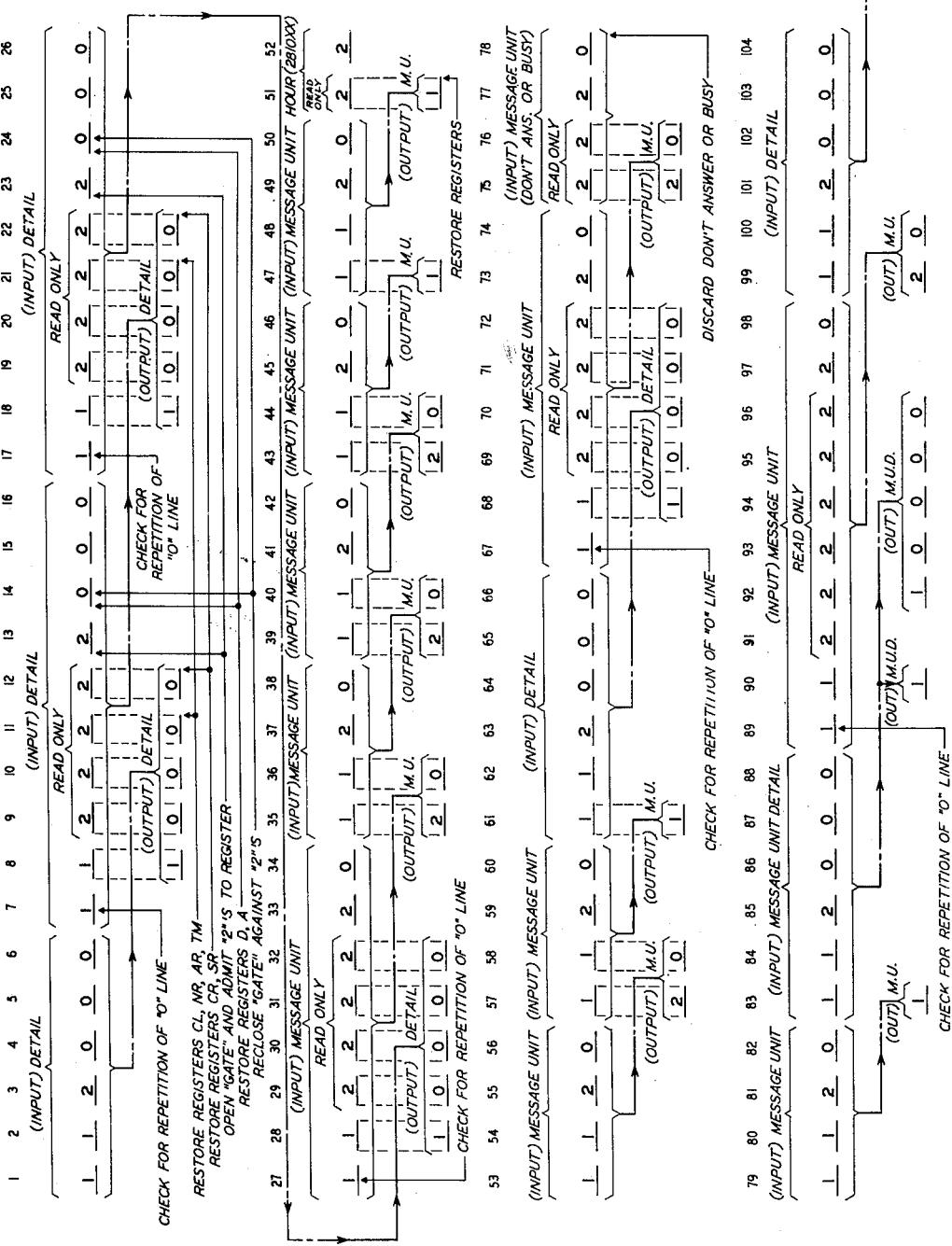

Fig. 15 shows the reader, the reader connector, the reading relays and portions of the off-normal and start circuits;

Fig. 16 shows the control circuit including the gate relays and certain of the registers including the message unit register, the chargeable time register and the input class register;

Fig. 17 shows the register connector relays and indicates the registers into which the items of information read from the tape by the reader are entered for processing together with a number of the control relays which operate to limit or speed up the overlap operation in accordance with various conditions; and Fig. 18 is a sequence chart depicting the progress of a number of typical calls and illustrating the overlapping process.

In the following description the various relays are designated by both letters and numerals which have come to have certain significance to persons familiar with the technical details of the disclosed arrangements. By way of example, the reading relays are known as the A0, A1 and A2 relays for the first group thereof used to register the A digit of the six-digit line used in the automatic accounting system tapes. In the present case, there are three relays in the first or A set and five relays such as the B0, B1, B2, B4 and B7 relays in each of the remaining five sets. In a great many cases a relay will have only such an alphabetic designation but in other cases it will have in addition a numerical designation which always consists of the figure number plus two other digits, whereby the location of a piece of apparatus can be at once found by turning to the corresponding figure number. Where conductors are designated by numerals in addition to the usual alphabetic designation thereof the number used will be a combination including the figure number wherein the conductor is first picked up in the tracing of a circuit and this number will be retained even though the conductors extend through another large number of circuits. Another convention used herein for the sake of clarity is a numbering scheme for the cables or bundles of conductors which must be carried over long distances. This is the use of a hyphenated number such as 29–118 indicating that this cable or bundle of conductors extends between Fig. 29 and Fig. 118.

For obvious purposes, in certain cases, conductors will bear the same alphabetic designation as other apparatus. This is not to be taken as a duplication of the designation but will be readily understood that such a conductor bears an intimate relation to the other piece of apparatus.

Similar logical means for designating various elements of the circuits will be found in the drawings and are used as an aid to the clear understanding of the present arrangement.

The exemplified embodiment of the present invention, as disclosed herein, comprises apparatus mounted in practice in or upon a cabinet or cabinets, a control panel, and a relay rack of the general nature illustrated in Fig. 1. Many mechanical details of the mounting arrangement are not discussed herein either because they are well known in the art, would readily be devised by those skilled in the art, or described and disclosed elsewhere, or for a combination of these reasons.

The operative apparatus includes relays, a tape reader, tape perforators, otherwise designatable as recorders, and auxiliary equipment for supplying tape and storing the used or reproduced tapes.

The tape reader is disclosed in the application of W. W. Carpenter Serial No. 666,280, filed May 1, 1946; obviously other devices of similar function may be employed.

The tape perforators may consist of devices such as disclosed in the application of W. W. Carpenter Serial No. 588,401, filed April 14, 1945, now Patent No. 2,583,086, issued January 22, 1952.

The disclosure of the present application is related to the disclosures of a group of patents and applications generally relating to equipment which may constitute an accounting office. The object of an accounting office from the over-all viewpoint is to process a tape of the kind produced in a central office having recorded thereon data relative to telephone calls specifically originating in or, more generally, set up through or by means of said central office and to process said tape with the ultimate result of producing through successive steps typed records giving the details of toll calls made by each subscriber during a given period of time, typed message unit records giving the number of units to be charged to each subscriber for a given period of time in cases where such subscribers are billed on a total message unit basis, and typed records of so-called straddle calls, i. e., those in which, for one reason or another, the answer, the disconnect, or the initial entry relating to a call are present on more than one tape. Within the scope of the invention certain other information may be derived and produced as a typed record, for example, line observing information, verification of numbers of newly connected subscribers, etc.

A tape suitable for initial use in an accounting office of the class referred to may be one produced in accordance with the disclosure of the application of Cahill-Carpenter-Dimond Serial No. 57,388, filed October 29, 1948, or the equivalent thereof.

Such a tape may contain entries resulting from the use of many transmission circuits (which may be known as district junctors or by other designations) of the central office. In such tapes the initial entries contain, among other information, the calling subscriber line number, answer entries, disconnect entries, and day and hour entries. Because a single recorder may be used in common to and ordinarily is used in common to a number of transmission circuits, the initial, the answer, and disconnect entries of a particular call are interspersed with entries relating to other calls. However, each such entry is identified by the transmission circuit used for the purpose of this call and the number of this circuit forms a part of the entry record.

These trunk or transmission circuit number entries serve an essential purpose in the first processing of the single office tape which is sometimes referred to as assembling. The nature of the assembling process and a disclosure of equipment for accomplishing it is found in the Carpenter-Gooderham Patent 2,558,476, dated June 26, 1951, which resulted from application Serial No. 724,992, filed January 29, 1947.

The assembling process results in a series of tapes which, when spliced together in proper order, comprises the input tape for the apparatus disclosed in this present application.

The invention disclosed and claimed in this present application consists of certain features of an accounting office now embodied in equipment known as a computer and which is sometimes more specifically designated as a computer-sorter because it may accomplish certain sorting functions.

A more elaborate disclosure of the computer is found in the application of A. E. Joel, Jr. Serial No. 101,087, filed concurrently herewith.

General appearance

The general appearance of one embodiment of the invention is given in the perspective view in Fig. 1. There are two cabinets 100 and 101 in which the relays and other small apparatus are mounted. The key and lamp panel are indicated at 102 and contain the set-up switches, the various lamps and the keys used in investigating the condition of the computer at any time, particularly after an alarm has been brought in. Two main alarm lamps 103 and 104 are indicated as being mounted near the top of the relay cabinets and are in such a position that they can be seen from any part of the large room in which this piece of apparatus is mounted along with similar appearing apparatus for the assembler, the sorter, the summarizer and the printer. Shown in this view, there are six cabinets of which the first one 105 houses the reader. A reel 106 below the reader holds a long length of tape such as 107 which feeds into the reader above and after being processed is returned to and wound on another reel. Each of the other cabinets such as the right-hand end one 108 houses a pair of perforators. In each of these cabinets there is mounted a bin such as 109 containing a long length of unperforated tape which after being processed by the perforator is fed into another bin 110. The computer may contain as many as nineteen perforators as will be explained hereinafter and each customer charge as it is computed is sorted by being selectively perforated on one or another of the various output tapes.

General operation

Fig. 2 is what might be termed a thumb nail sketch to explain the organization of the device forming the subject-matter of the present invention. It consists of a reader 200 for reading the perforations on an incoming tape representing items of information comprising the gathered and assembled data for customer or subscriber charges. As the various codes are sensed by the reader they are then distributed by means of the register connectors 201 to registers 202. The registers here represent a temporary holding means for the information, part of which is used for calculating purposes or for internal rearrangement and is reregistered and part of which is retained in its original form before being routed to output tapes. At any rate a selecting means, here shown as the line pattern connector 203 is employed to glean from the registers selected bits and items of information and then through another distributing arrangement, the perforator connector 204 to route the computed charge data to the various perforators 205 whereby a plurality of output tapes are formed.

There are two communication channels, or trunks, one to transmit the incoming data from the reader to the registers and the other to transmit the outgoing data from the registers to the tape perforators. The registers form the heart of the device, for it is within this arrangement that the information is processed and held ready for the output circuit to make its selection and its records.

This Fig. 2 will then be regarded as a backbone or skeleton for the more elaborate schematic shown in Figs. 4 to 13, here arranged as shown in Fig. 3.

In this general schematic of the system, the input or reading means is shown in Fig. 4. This consists of a reader 400, a device essentially for the sensing of the twenty-eight code perforations in the automatic accounting system tape, incoming to this unit of the system and which had been produced as an output tape by the assembler. The reader consists of an assemblage of twenty-eight pins which seek to pierce the holes perforated in corresponding positions of the tape, those which succeed, signaling the achievement by connecting ground to a corresponding conductor and those whose path is blocked by unperforated tape holding their corresponding conductors open.

The twenty-eight conductors connected to the twenty-eight reader pins pass through the contacts of the reader connector 401 by means of which they may be connected as determined by the control circuits to the reading relays. In the case of the first three of these conductors representing the code for the first or A digit, an additional break is placed in the path of these conductors consisting of the make contacts of the ST3 start relay 402 in the off-normal and start circuit 403 so that the A digit codes cannot operate the A digit reading relays until the device has been properly started and is in satisfactory operation.

The coded grounds are thus extended to and operate the reading relays during the reading interval and so far as the registers into which the codes are read merely act to relay the ground signals from the reader. However, the reader closes but a single path whereas each reading relay controls a plurality of contact sets whereby the validity of a code may be tested and various other control circuits may be closed whereby the item of information contained in a code being read by the reader not only may be forwarded to a register but a part of the code may be used for control and other operations.

As clearly indicated in Fig. 4, the twenty-eight places of the code are allotted three for the first or A digit and five for each of the following five B, C, D, E and F digits. The A digit reading relays 404 consist of the A0, A1 and A2 relays and are used to index the line read and to thus classify the information contained in the other five digits.

By way of example, a zero in the A digit, signaled by the operation of the A0 relay, may be a splice code or a supplementary line of an initial entry, a 1 in the A digit, is a timing entry such as the disconnect or the answer time, the 2 in the A digit may be the first line of an initial entry, one of the tape identity codes or some special code and lastly a 3, signaled by the simultaneous operation of all three A0, A1 and A2 relays may be a special code such as a timed release at the disconnect time.

Each of the remaining five digit groups of reading relays such as the B digit group 405 have five relays designated 0, 1, 2, 4 and 7 and are known as a two-out-of-five group, since the code to express any one of the ten digits consists of the energization of two out of the five available relays in such a combination that the sum of their designations equals the digit expressed. An exception to this general rule is that the operation of the 4 and the 7 relays expresses the digit 0.

The splice code 081010 is then expressed by the operation of the A0 relay in the A digit group 404, the B1 and B7 relays in the B digit group 405, the C0 and C1 relays in the C digit group 406, the D4 and D7 relays in the D digit group 407, the E0 and E1 relays in the E digit group 408 and the F4 and F7 relays in the F digit group 409. Other codes are expressed in like manner.

The tape identity codes are those which have the same first three digits 289 and count from 2891XX to 2899XX so that in this case the 289 is used for certain control purposes, the 1 to 9 in the D digit for counting purposes and generally only the last two, the E and F digits for actual information purposes.

When it comes to the actual information codes, such as the timing entries and the initial entries, then only the A digit is used for indexing purposes and the rest are all used for true information purposes.

Other entries interspersed with the three informational codes above, such as the hour entries contain actual information in only the last two or three digits and identification of the entry in the others or at least in the first four or three thereof.

The computer is prepared for operation by adjusting a plurality of set-up switches to express information concerning a tape to be processed. Such switches are here represented by the E and F set-up switches 1100 and 1101, respectively, and by means of such switches the following information may be established:

1. Sort of MU calls to be effected
2. Marker group—tens
3. Marker group—units
4. First recorder—tens
5. First recorder—units
6. Last recorder—tens
7. Last recorder—units
8. Day of round—first
9. Day of round—last
10. Month—tens
11. Month—units
12. Round All of this information with the exception of the first will be found in the tape identity codes and these codes must check by automatic circuit operation against the setting of the switches before operation of the device may proceed.

After the set-up switches are adjusted and the incoming tape has been introduced in the reader the tape end key is operated temporarily and then the start key is operated. It is necessary to operate the tape end key first because the ends of all output tapes must be prepared before the computer can go into operation and, therefore, the circuit is so arranged that until the tape end key has been operated and then restored the operation of the start key will be ineffective. Once the tape end key has been operated the operation becomes automatic and twenty-seven or some multiple thereof of the splice code will be perforated in all the output tapes. In accordance with certain arrangements which will be fully explained hereinafter, nine codes are spread over the output tapes and this is repeated three times. If the tape end key is restored before this operation is complete, then the operation will halt after each output tape has had twenty-seven splice codes perforated therein, otherwise the operation will be automatically repeated. Thereafter, the start key will be effective.

In the lower part of Fig. 11 the rectangle 1102 represents the entry spread progress circuit and consists of a sequence arrnagement known as a walking circuit, whereby the ten MU perforators are operated in turn followed in order by the perforators for the straddle tape, the line observing tape, the MU detail tape, and the six detail tapes or any selection of these which may be determined by the nature of the incoming tape and recorded on the set-up switches. These various perforators, or rather means to sequentially render them operative to perforate a given code are here represented by the relays such as the MU0 relay 1103 at the left to the DET6 relay 1104 at the left.

The control of this entry spread progress circuit over the perforators is here shown schematically by the conductors such as the O conductor 1105 controlled by the MU0 relay 1103 and the 6 conductor 1106 controlled by the DET6 relay 1104 which may be effectively traced over the path 1107 through the day sort control 1300 and the perforator register 1301 to the perforator connector relays such as the P-0 relay 1302 and the P-18 relay 1303. Thus, the perforators such as the PERF.0 designated 1304 and the PERF.18 designated 1305 may be sequentially connected to the trunk for controlling the perforations to be made.

This trunk consisting of twenty-eight conductors extends from the line pattern connector 1108, through Fig. 12 and Fig. 13 to the twenty-eight relays A0 to F7 here shown as the perforator check circuit 1306.

The 081010 splice pattern code is formed in the line pattern connector 1108 employed for the end of tape preparation. In this rectangle, there is indicated the 081 relay 1109 which will extend grounds to the conductors of the perforator code trunk described so that each perforator as it is sequentially connected to this trunk will, as before stated perforate a series of nine splice pattern codes, to be repeated three times.

It may now be assumed that the tape end key is restored and the start key is operated so that the device will go into operation. The splice code on the end of the incoming tape will be passed through the reader until the tape identity codes are encountered. These nine codes 2891XX to 2899XX in order. The first of these must have the tape index 02, indicating that the incoming tape is one prepared in a second sort operation by the assembler. In the computer then the first code encountered after the splice pattern is 289102 and no other code will advance the operation of this device to further operations. It may also be noted at this point that no other accounting system device will accept this tape except the printer when set for verbatim printing.

The tape identity codes are then read by the reader, each in turn, and the information they carry is checked against the information expressed by the setting of the switches such as 1100 and 1101, also here generally indicated by the rectangle 500. Each of the codes 2891 to 2899, inclusive, will be expressed by the A, B, C and D digit reading relays and passed to the tape identity progress circuit 501 wherein a series of relays such as L1 relay 502 and L9 relay 503 will respond as each line is checked. As each line proves satisfactory a signal is given over the RS1 lead 504 to operate the RS1 reader step relay 700 to properly advance the tape in the reader to the next code. On the last line the reader step relay is not operated immediately, but held until this information can be spread on the output tapes. When the full nine lines of the tape identity codes have been checked, then the IC tape identification check relay is operated, and this will start the next operation by which the tape identification is spread on the prepared ends of each output tape, the complete nine lines on one tape and corresponding lines then repeated on the next tape under control of the entry spread progress circuit 1102. The TIE, tape identification ended relay 505 operates after all the tape identification codes have been perforated in all tapes.

The specific information for each line of tape identification is derived from the setting of the set-up switches such as 1100 and 1101 under control of the line pattern connector 1108 for the end of tape, such information being transmitted over the output trunk to the perforators such as 1304 and 1305.

The output tape ends having been prepared and a reader step relay having been operated, the first code of the time group having an item of general information is read. This is the recorder number in the form 280XTU where the D digit (X) is used to indicate that the recorder is a regular or an emergency unit and the E and F digits provide the tens and units digits of any recorder number from 00 to 19.

The A digit reading relays are shown here as exercising a control over the control circuits 506 and these in turn over the paths 597 and 600 as controlling the recorder register connector 701. If no recorder number has been registered then the RCRA relay 702 will be operated to register the D, E and F digits being read by the reader in appropriate parts of the recorder register 703. It may be noted at this time that where the recorder number code is encountered again at the beginning of another section of the incoming tape, the RCCA comparing relay 704 will be operated so that the recorder number may be compared with the number previously registered.

The next code is the hour code, 2811TU, and now the control circuits 506, over the path 601 cause the operation of the hour register connector 602 to register in the earlier hour register 900 this hour entry (generally 03). If this is as now assumed the first hour entry, then the H1A—B relay 604 is operated to register the hour as read. It may be noted that each subsequent hour entry, 2810TU, is through the H0A—B relay 603 whereby the value of the hour is reduced by 1 as it is transmitted to the earlier hour register 900.

The hour having been registered in the earlier hour register it is now transferred through the hour transfer check connector 901 to the current or disconnect hour register 902. This being the first hour entry such transfer takes place immediately. Where, under other circumstances, there is an existing registration in the disconnect hour register 902, then a check is made to see that the hour registered in the earlier hour register is one less in value than such existing registration and when this is proved the said existing registration is released and that in the earlier hour register 900 is transferred to the disconnect hour register 902.

The third and final item of general information is the calendar day code, in the form 2821TU, where T and U stand for the tens and units digits of the actual calendar day. Again the control circuits 506 over the path 601 operate the day register connector 605, and the registration is made in the day register 903. This is made in the decimal code, there being four tens relays representing the 0, 1, 2 and 3 for the tens digits of the calendar day and a full complement of ten units digits. When this registration is complete the computer is ready to proceed to its main duties.

It may be noted that the central office tape having been passed through the assembler twice, once on a units digit sort and once on a tens digit sort there may be as many as one hundred sections in the 289102 tape coming to the computer. These time group entries will follow the splice code in every case and, therefore, the processing of each section of a tape is preceded by the reading of these three, recorder, hour and day entries. During the processing of a tape section, there may be regular hour entries and these will adjust not only the hour registration but the day registration, for as the hour changes from 00 to 23, at midnight, the date also changes. This usually results in the diminution of the date by 1 but may entail a complete change, such as from 1 to 31, 30, 29 or 28.

The recorder hour and day entries are not copied on any one of the output tapes but the registrations are held available to the line pattern connector whereby bits of information are gleaned from different sources to form the required output lines.

The computer acts as a sorting device to sort the various charges into different categories, such as message unit charges, toll charges, detailed records, line observing records and irregular records as well as discards. In addition, in single office marker groups, the message unit calls may be further sorted by one digit of their directory numbers. Tapes from multioffice marker groups must be sorted by offices. Where the incoming tape from the assembler contains records for more than one day the detail records may be sorted in days. The controls for these different sorting operations are primarily responsive to the information in the initial entries and are further vested in the set-up switches and certain auxiliary circuits as will more fully appear hereinafter.

A regular message unit (MU) call record consists of three entries, the disconnect time, the answer time and the initial entry and it is not known that this is a message unit record until the initial entry is reached. However, the disconnect time and the answer time are registered and transmitted to the calculator and generally the elapsed time is calculated before the initial entry is registered. All three entries, however, must bear the same call identity index. This is registered upon the registration of the disconnect time and the index with each of the next two entries is compared with it.

Let us take as an example a call made by a subscriber at station SUmmit 6–5444, within the period covered by a record about to be processed. The initial entry for such a call, which happened to be made over a facility identified by the call identity index 27 would be 213027
035444 in which the message billing index (digit C of the first line) is assumed to be 3 and the office index (digit B of the second or first supplementary line) is 3 and which combined with the marker group would identify the office SUmmit 6. Let it be assumed that the call was answered at 11.535 and the disconnect took place at 11.582. The answer timing entry would then be

153527 and the disconnect timing entry would be

158227

Now this call would have been assembled by the assembler and recorded in such manner that it would now be read by the computer in the form:

158227
153527
213027
035444

Therefore, the reader may now be assumed to read the first of these lines:

158227

The control circuits 506, over the path 600, cause the operation of the DTRA—B relay 705 in the timing entry register connector 706 so that the B, C and D digits thereof may be transmitted through the B, C, and D sections of the disconnect time translator designated 1000, 1001, and 1002, respectively, whereupon the three digits 5, 8 and 2 are translated from the two-out-of-five code to the biquinary code, which is peculiarly well adapted for calculation. After translation these three digits are transmitted to the adder 1003 where they are registered in the TD (tens, disconnect), UD (units, disconnect) and PD (tenths, disconnect) adder relays.

At the same time the disconnect time is transmitted to the disconnect time register where a record of this data may be retained until it is certain that it is no longer needed. The arrangement of the disconnect time register 606 and the disconnect time translators 1000, 1001 and 1002 is such that while both are operated by the reader, the latter are then held operated by the register 606. In this sense, the register is needed until the call has been disposed of. However, the register 606 has a regulator output which may not always be used. In a regular MU call it is not needed but in a detail call or an irregular call it will be needed. It is, therefore, registered in the disconnect time register until the processing of the data for this call is completed.

The E and F digits 2 and 7, respectively, of this first line of the entry constitute the call identity index and must be registered to identify later entries of this same call. Accordingly, when this line is read by the reader the control circuits 506, over the path 607, cause the operation of the DJR2 relay 608 whereby the E and F readings of the code are transmitted over path 609 to the call identity index register and decimal translator 800. The call identity index is, therefore, retained for reference purposes and for comparison with the call identity index readings of the succeeding entries of this call.

When the disconnect time register 606 up-check circuit and the call identity index register 800 up-check circuits are closed showing a proper registration of this entry, the RS1 reader step relay 700 (circuits not indicated) is operated and the reader is advanced to read the next entry, the answer time.

The answer time line

153527 is now read by the reader. The control circuits 506, over path 600 now cause the operation of the ATRA—B relay 707 whereby the B, C and D digits 535 of this line are transmitted to the B, C and D answer time translators 1004, 1005 and 1006, respectively, for transmission on a biquinary basis to the TA, UA and PA relays of the adder 1003.

As soon as the adder up-check circuits report a satisfactory registration the elapsed time will be calculated. The method of calculating is to express the addend in its natural form, the augend as its nine's complement, to add in a one in the lowest denominational order and to ignore, or throw away the carry one out of the highest denominational order. Thus, where the disconnect time is 58.2 and the answer time is 53.5 the elapsed time is 4.7 and this is arrived at by adding 582
464
1
———
1047 wherein the left-hand 1 is discharged so that the result becomes 047.

There are, however, other considerations in calculating the elapsed time and hence the value calculated in the tens order is carried through the hour tens adder 1008 so that 6 (for 60 minutes) or some multiple thereof may be added if there have been one or more hour entries between the disconnect entry and the answer time entry. In the present case we assume there have been no such entries and hence the value 0 is transmitted through the hour tens adder 1008 without change, and the three digits 047 are brought into the elapsed time round-off translator 1307, each to its corresponding denominational order. In actual practice, a small time allowance to cover traffic delay in establishing a connection after the called party has answered and delay in recording the disconnect signal is made and then the call is rounded off to the next higher minute. The details of these operations carried out in the elapsed time round-off translator 1307 are described in detail hereinafter. The output of these translators is chargeable time and as such will be used as described hereinafter. The carry-out from the tens translator goes into the control circuits (not shown) for purposes to be described. The carry-out 0 will indicate a negative result while the carry-out 1 will indicate a normal positive result and will constitute a signal to advance the operations.

As in the case of the disconnect time, the answer time also is registered in the answer time register 708. When the answer time up-check circuit is closed the AUC relay 709 is operated providing the call identity index also checks and the RS1 reader step relay is also operated to advance the reader to the first line of the initial entry.

Upon the operation of the ATRA—B answer time register connector relay 707 a ground is extended directly to the JCT—JCU call index check connector relay 610 whereby the E and F digits of the answer time line (constituting the call identity index) are extended for comparison with the call identity index already registered in the call identity index register and decimal translator 800. If the comparison of these numbers proves them to be identical then a check circuit combined with the up-check circuit for the answer time register 708 will cause the operation of the reader step control to advance the tape in the reader so that the first line of the initial entry may be read.

The first line of the initial entry is now read by the reader. The A digit is 2 and since this has been assumed to be an MU record the B digit is 1. The B digit in the first line of each initial entry indicates the general character, message unit, detail or line observing and will cause the operation of a corresponding relay in the input class register 509 which is of prime importance in the latter operation of the output class register 1111. In this case the control circuits 506 over the path 607 operate the CLRA—B relay 611. The value in the C digit is transmitted to the billing index register 801 and the call index check connector 612 is operated as before to check the call identity index in the register 800.

The reader line count circuit 508 may actually be considered part of the control circuits 506 and is shown as being operated from the same source and as having a control over these control circuits. It functions to keep a count of the lines of code read for each group of lines constituting the charge data for each call. It is a steering means and is shown as providing a path for the connector relays for the supplementary lines of the initial entry.

Thus, on the first supplementary line of the initial entry which follows the proper entry of the first line and the successful comparison of the call identity index, the reader line count circuit 508 will cause the operation of the NRA—B—C calling number connector relay 613. Thereupon, the B, C, D, E and F digits of this supplementary line will be transferred to and registered in the calling number register and decimal translator 802, so that the output line or lines are now ready to be perforated if everything has been regular.

The B, C and F digits have output paths leading through the sort class connector 1110 to control the sorting of the call in accordance with predetermined conditions, particularly as recorded on the set-up switches.

Meanwhile, during the reading of the lines of the initial entry the computation of the elapsed time has taken place, so that during the registration of the last supplementary line the output is prepared. Assuming everything to be regular and the chargeable time to indicate nine or less message units, then the charge data becomes a single line transmitted to the particular output perforator selected by the sort class connector 1110 and the value of the digit registered in the calling number register 802. Under control of the output class register the DN directory number pattern forming relay 1200 will be operated to control the pattern of the output.

The number of message units is calculated from the computed chargeable time. The output of the elasped time round-off translator 1307 is transmitted through the message units formula circuit 1201, under control of its connector 1202 and the calculated message units are registered in the message units register 1203. It may be noted that the chargeable time is in some cases also transmitted through the chargeable time translator 1204 and registered in the chargeable time register 1205 where it is available where details are wanted. In the case under assumption it is not needed and will not be used. However, the number of message units calculated and which have been assumed to be capable of being expressed in one digit are available over the F path coming out of the message units register 1203 and are transmitted by the BK1—A relay 1112 in the output class register 1111 to the B group of contacts of the DN relay 1200 so that the B digit of the output line will contain the computed charge in message units.

The calling line number is transmitted from the C, D, E and F parts of the calling number register 802 to the C, D, E and F contacts of the DN relay 1200 so that these digits of the output line will contain this calling line number.

The A digit of the output line is formed through the operation of one of the relays in the output class register 1111, such as the BK1—B relay 1113 so that this is recorded as 1.

Had the number of message units calculated been ten or over, and, therefore, been capable of expression only in two decimal digits, then the output becomes a two-line entry with the DN pattern relay 1200 operated for the first and the TMU relay 1206 operated for the second line. In this case, the A digit of the first of these lines is recorded as 2 under control of the BK2—B relay 1114, and the B digit is recorded as 0 under control of the same relay (path not shown). The C, D, E and F digits are derived as before from the calling number register 802.

The second line is formed by the TMU relay 1206. The A and B digits both become 0 under control of one of the relays in the output class register such as the BK2—B relay 1114. The computer connector and control circuit 805 may be set to operate through the call type translator 507 to change the record in the B digit through the TMU relay 1206 from a 0 to a 1 or 2.

The C and D digits are invariably zeros in this line under control of the DAB relay 1115.

The E and F digits are supplied by the output of the message units register 1203.

As each output line is perforated the perforator check circuit 1306 reports the progress of the operations to the perforator control circuits 1309 and after a complete set of charge data lines have been perforated on a selected output tape the individual and specific operating units are released and made ready for another call. Items of general information, such as the hour and the day are retained since this information is common to all the calls within a given section of tape. In actual service there is an overlap operation of elements of the device, consisting of the release of the disconnect and answer registers as soon as it is determined that sufficient information has been stored for the perforation of an output tape. Thus, the disconnect and answer registers may be cleared before the computer has completed its task and the disconnect time and the answer time for the next call may be in process of being registered and may even be completely registered before the remainder of the device is released.

It is not necessary to describe in detail the complete operation in other types of calls. All calls or groups of items of information representing the data for each customer charge consists of three items, a disconnect time, an answer time and an initial entry. In each case the two timing entries are entered first so that they may be placed in the adder at the earliest possible moment so that the computation of the elapsed time may be made as the remaining information is being entered. The simplest case has been described in which certain of the apparatus provided has not been used. In the more complex cases such as the toll or detail call the area and called office register 803 and the called number register 804 are called into use to store information contained in the initial entry and from which information is gleaned by the pattern relays of Figs. 12 and 13 for forming the output lines.

One of the important items on all calls in which the details of the charge are reported is the start time line. This is a line coded from six digits of the day, hour and minutes at which the call is started, generally speaking, the answer time. The tens and units digits of the calendar day are taken from the day register 903, passed through the connector 904 to the day register translator 905 from which the tens digit is passed to the start time line register 906 for combination with the minutes tens digit from the answer time tens translator 1004 to form the B digit of the start time line. In a similar manner, the hour tens digit is taken from the disconnect hour register 902, passed through the start time line register connector 908 and combined in the start time line register with the minutes tens digit from translator 1004 to form the C digit of the start time line. The B and C digits thus formed are transmitted to contacts of the TW pattern relay 1308 for use as required. The D digit of the start time line is the units day digit and, therefore, is the F digit coming out of the day register translator 905. The E digit of the start time line is the units hour digit and, therefore, is the units digit taken from the current or disconnect hour register 902, passed through the start time line register connector 908 and registered in the time pattern register 909. The F digit of the start time line is the units digit of the minutes and comes from the units section of the answer time register 708 and is passed through the start time line register connector 908 and registered in the time pattern register 909.

Thus, the main elements of the computer and their cooperative relationship to each other have been briefly noted and may be summarized as follows. The computer consists of a reader for reading off items of information from an incoming tape, a plurality of registers and translators for storing the information, a calculator for computing charges, a pattern circuit for supervising the lines of a computed charge and a plurality of perforators, selectively taken into service for recording the computed charges under control of the reader.

Supplementary to these regularly employed elements is the straddle circuit which has supervisory functions and acts to keep a constant watch on the operations of the computer so that if there is any deviation from regularity the control is seized and the call is then disposed of under direct control of this circuit. Certain calls such as don't answer and busy calls are discarded and others are recorded on a straddle tape where full details may be spread before a clerk for proper disposition. The important element in this circuit is the entry progress register which has a connection from each of the registers to report the proper operation thereof. Herein is shown, by way of example, the path 614 leading from the disconnect time register 606 to the entry progress register 510 to report the proper entry of the disconnect time. Should the disconnect time fail of registration and the other elements of the call be properly registered then the entry progress register would report a call with only one timing entry and if this were at a leading tape end the straddle input register 511 would be operated, in turn operating the straddle output register so that details of the call would be reported on the straddle tape. There are numerous circumstances by which the straddle circuit takes charge of the output circuit, dealing with numerous causes of irregular calls, all of which are more fully described in the said Joel application.

*The characteristic features of the invention*

One of the features of the present invention is an overlap arrangement whereby time is saved by registering items of information pertaining to a following customer charge while the device is still in process of digesting the data for a previous charge. Where the items of information constituting the data for a customer charge are received in the following order, first, the time at which the customer ceased to use the facilities for which he is being charged, second, the time at which the customer use of the facilities was begun and third, other bits of information regarding the use made of the facilities, such as the identification of the customer and the rate at which he is entitled to use the facilities, it will be clear that the elapsed time may be calculated just as soon as these first two items are registered, regardless of how the remaining bits of information may affect the final result. Therefore, the calculating operation is started just as soon as the second item is registered, and since the calculation is very rapid it will be generally completed before the items of the third sort are registered. Therefore, as soon as the calculation of the elapsed time is well under way the disconnect and answer registers are cleared and the disconnect and answer times for the next customer charge are admitted.

This overlap operation can be seen from the schematic drawings of Figs. 15, 16 and 17 and the time chart of Fig. 18.

The data for a customer charge is read off a tape by the reader 1500 here depicted as a plurality of contacts. The contacts G1, G2, K8 and J0 are control means while the actual reading contacts, twenty-eight in number are designated A0 to F7. All these contacts operate periodically the G1, G2 and the reading contacts operating for a period of about 40 milliseconds and remaining open for a period of about 20 milliseconds for each reader cycle. Only those reader contacts close which encounter code perforations in incoming tape. The K8 contact opens for a period of about 40 milliseconds during the reading interval and closes for a period of about 20 milliseconds during the remainder of the cycle, spoken of as the open interval. The J0 contact closes and opens for the same length periods as the reading contacts but is delayed about 9 milliseconds in each of its operations.

The G1 and G2 contacts together with the RKA relay 1501 and the RKB relay 1502 constitute the reader step check circuit which it is only necessary here to note will act to periodically ground the conductor 1503, alternately through contact G1 and the back contact of the RKA relay 1501 and contact G2 and the front contact of the RKB relay 1502 so long as operations of the reader are proceeding normally.

The RCA—B—C—D relay 1504 is the reader connector and is employed to interconnect the reading contacts of the reader and the reading relays. This relay is normally operated. Thus, the conductor 1503 is normally extended through the armature and back contact of the AL alarm relay 1505 to the reading relay check circuit extending through armature and contact networks of each of the B, C, D, E and F groups of reading relays to conductor 1506, through the armature and back contact of the GT4 relay 1600 to the winding of the CK relay 1601. The contact networks of the reading relays will close this circuit through and will cause the operation of the CK relay when and only when a valid combination of two out of the five reading relays of each digital group of reading relays is operated.

The GT4 relay 1600 and the CK relay 1601 constitute what is known as a gate. Without the operation of the CK relay 1601, the GT4 relay would operate periodically from the J0 contact and thereby cut off the conductor 1506 from the remainder of the control circuit. But the CK relay, upon the closure of the check circuit through the reading relays is about 9 milliseconds ahead of the GT4 relay and it upon operating opens the circuit of the GT4 relay and leaves this gate closed. It is only when there is some delay in the closure of the check circuit that the GT4 relay will succeed in its operation and this is for the purpose of opening the gate path to the controlling relays when there is such a delay and the controlling relays will, therefore, have less than a full opportunity to operate.

Now when a timing entry, such as a disconnect time is read by the reader, the ground on conductor 1506 besides operating the CK relay 1601 will also be extended over the armature and front contact of the TIE tape identification ended relay 1602, the armature and back contact of the MTID relay 1603, the armature 1 and back contact of the L4B relay 1604 and thence through the armatures and contacts of the A2, A1 and A3 reading relays, operated on a timing entry to express either the digit 1 or the digit 3, to conductor 1508, the armature and back contact of the RLS relay 1507, the armature and front contact of the DTUC up-check relay 1605, the armature and back contact of the GT1 gate relay 1606, the armature 2 and back contact of the DTMB relay 1607, the armature and back contact of the ATTR relay 1700, the armature 1 and front contact of the ADDC answer and disconnect register down-check relay 1608 to the winding of the DTRA—B disconnect register connector relay 1701. The disconnect register 1702 is thus connected to the contacts of the B, C and D groups of reading relays so that the disconnect time in tens, units and tenths of a minute may be registered.

As soon as any of the relays in the disconnect time register are operated the down-check is broken and the ADDC relay is released. The DTRA—B relay 1701 is held operated during the remainder of the reading interval through its own armature 2 and front contact.

Through means not shown here but fully explained in the said Joel application, when the disconnect time has been properly registered in the disconnect register 1702 then the RS2 reader step relay 1609 is operated and the tape is advanced so that in the next reading interval the next code will be read. Under normal conditions, this will be the answer time and, therefore, will have to be put into the answer time register 1703.

During the operation of the DTRA—B relay 1701, ground on the front contact of the AL relay 1505 is extended through the armature 1 and front contact of the DTRA—B relay 1701, the armature 4 and back contact of the DTMB relay 1607 to cause the operation of the DTMA relay 1610. This relay operates and prepares a circuit for the DTMB relay 1607 so that when the RS2 relay is operated a ground will be extended by the K8 contact during the open interval following the reading interval in which the disconnect time was registered, thence in a chain circuit, through the armatures and back contacts of the reader line count relays, the armature 1 and back contact of the ATMA relay 1611, the armature 3 and front contact of the DTMB relay 1607 which now locks in a chain circuit, through the back contacts and armatures of the reader step relays to ground supplied at the front contact and armature 2 of the ST3 relay 1509.

Therefore, as the next code containing normally the answer time is read the ground heretofore traced from the armature and back contact of the GT1 relay 1606 is now extended over armature 1 and front contact of the DTMB relay 1607, thence through the armature 2 and back contact of the ATMB relay 1612 to cause the operation of the ATRA—B relay 1704. This relay constitutes the answer time register connector relay and, therefore, connects the answer time register 1703 to the B, C and D digits of the reading relays so as to register the tens, units and tenths of a minute expressed in these reading relays. The disconnect time register connector DTRA—B relay 1701 was released at the end of the reading interval in which it was used.

If this answer time is properly registered then the reader step relay 1609 will again be operated and the tape will be advanced. During the operation of the ATRA—B relay 1704, a ground will be extended through armature 1 and front contact of this relay through the armature 5 and front contact of the DTMB relay 1607 to cause the operation of the ATMA relay 1611 and in the manner hereinbefore described during the open interval the ATMB relay 1612 is operated.

The next code to be read will be the first line of an initial entry. This is one beginning with a 2 in the A digit and consequently the ground extended through armature 1 and back contact of the L4B relay 1604 will now be transmitted through the armature and front contact of the A2 relay and thence in series through the armatures and back contacts of the A1 and A0 reading relays to the armature of the GT2 relay 1613. In the first line of an initial entry the B digit thereof is known as the entry index and may be any one of the digits 1, 3 or 4 in which case at least one of the B0, the B2 or the B4 reading relays will be operated and hence the ground on the armature of the GT2 relay 1613 will be extended through an armature and contact of one of the B reading relays, the armature and back contact of the RCR relay 1614, the armature 2 and front contact of the CLDC class register's down-check relay 1615 which must be operated at this time if the registers of the computer are in condition to receive and register the initial entry, thence in series through armatures and front contacts of the NDC, the ADC, the CDDC and the TDC relays, all of which down-check relays are operated at this time, to the winding of the CLRA—B relay 1705. The operation of this relay besides acting as a register connector for the billing index register 1706 enables the input class register shown generally here in the form of the three relays, the MUB relay 1616, the DETB relay 1617 and the LOB relay 1618. The CLRA—B relay 1705 extends ground from its armature 2 and front contact to cause the operation of the GT1 relay 1606 and also to close the gate through which the answer timing entries may pass. During the operation of the CLRA—B relay the entry index contained in the B digit reading relays operates one of the input class register relays which registers the billing index from the C digit reading relays while the call identity index is being read from the E and F digit reading relays. These operations being successful, one of the reader step relays is operated and the tape is moved on so that the second line of the initial entry may be read. The L4A relay 1619 is operated during the operation of the CLRA—B relay 1705 and the operation of the L4B relay 1604 follows when the reader step relay is operated during the open interval from the K8 contact. Therefore, when the first supplementary line of the initial entry is read the ground heretofore extended over the armature 1 and back contact of the L4B relay is now extended through the A2, A1 and A0 relays operated to express the digit zero to the armature 1 and back contact of the L3B relay 1620, thence through the armature 2 and front contact of the L4B relay 1604, the armature 1 and front contact of the NDC relay 1621 which, through its operation, indicates that the calling number register 1707 is available for use to the winding of the NRA—B—C relay 1708 which relay acts as the calling number register connector relay to connect the B, C, D, E and F digits from the reading relays to the calling number register 1707.

At this time if the B digit of the first line of the initial entry had been 1 so that the MUB relay 1616 had been operated, then upon the operation of the NRA—B—C relay 1708 a circuit would be established from the armature 2 and front contact thereof through the armature 1 and front contact of the MUB relay 1616 to operate the LLA last line relay 1622 thereby denoting that this first supplementary or the second line of this initial entry is the last line thereof. If the B digit of the first line of the initial entry had been another digit so as to operate the DETB relay 1617 or the L0B relay 1618, then a circuit would have been provided through the armature and front contact of some one of these relays to operate the L3A relay 1623 so that the L2A relay is left to count the second supplementary line and the LLA relay is left to count the third or last supplementary line of the four-line initial entry.

Upon the operation of the NRA—B—C relay 1708, the GT2 relay 1613 is operated from an armature and front contact of the NRA—B—C relay 1708 and this relay now locks through the back contact and armature 1 of the CLDC relay 1615 to a ground supplied by the ST4B relay 1510. The gate for allowing the entry and registration of an initial entry and the other matter such as hour entries that come within this time is thus closed and will remain closed until through the operation of the CLDC relay it is certain that all the registers concerned in this operation are back to normal and are ready to perform their duties in connection with the next call.

During the beginning of the operations described herein and while the ADDC relay 1608 was operated, two grounds were extended from two armatures of the ST4A relay 1511 each for separately operating the ADHA—B relay 1624 and the ADHC—D relay 1625. These two relays together actually constitute one large multicontact relay and function to provide holding grounds for the disconnect time and answer time registers. In order to insure that this virtual single relay is operated as a whole, each of these two relays 1624 and 1625 is separately operated and the locking path for one is controlled by the other. Thus, the locking path for the ADHA—B relay 1624 extends through the armature 1 and front contact of the ADHC—D relay 1625 and thence through either a back contact of the armature of the ADR relay 1626 or a front contact and armature of the ADRH relay 1627 to a ground supplied by the ST4A relay 1511.

As soon as both the disconnect time register 1702 and the answer time register 1703 are operated, the values expressed therein are transferred to the adder, and as explained in connection with Figs. 4 to 13, the results derived are registered in the chargeable time register 1628 and the message unit register 1629 and the start time line is composed and registered.

The operation of the ADR answer and disconnect register release relay 1626 opens the locking circuits for both the ADHA—B relay 1624 and the ADHC—D relay 1625 and these relays in releasing will release the disconnect time register 1702 and the answer time register 1703 so that the ADDC relay 1608 may again become operated. The ADR relay 1626 is included in a complicated control responsive to a great many different conditions. One of these conditions and the most commonly used and which indicates the normal operation is as follows: When the registration of the items of a charge is being made and it has progressed to the point where the first line of an initial entry is being registered it will then appear that the call is regular. In other words, no conditions have arisen which would divert this call to the straddle tape and consequently the RSRT regular sort register relay 1709 will operate, its operating path here being indicated as ultimately responsive to the circuit provided by the armature 2 and front contact of the CLRA—B relay 1705. Also the TUC start time up-check relay 1630 operates to report the fact that the start time line has been composed and properly registered. The CLUC class register's up-check relay 1631 also operates to report that various class registers such as the input class register, containing by way of example the MUB relay 1616, has been properly operated. Therefore, a path may be traced from a ground supplied by one of the message unit register relays such as the MUT0 relay 1632, the front contact and armature 2 of the MUB relay 1616, the armature and front contact of the RSRT relay 1709, the armature and front contact of the TUC relay 1630, the armature and front contact of the CLUC relay 1631 to the winding of the ADR relay 1626 thereby operating this latter relay and causing the release of the disconnect time register 1702 and the answer time register 1703. When these two registers are fully released the answer and disconnect down-check ADDC relay 1608 will operate and place the circuit again in condition to register a timing entry.

All of these operations take place shortly after the operation of the CLRA—B relay 1705 which responds to the entry of the first line of an initial entry so that it will be seen that the way is cleared for the entry of the timing entries of a following call even before the complete information for the call being processed has been entered.

At the bottom of Fig. 17 there is shown a number of relays in what is known as the computer connector and control circuit. The function of these relays and the part they play in the operation may be shortly noted as follows: When the computer circuits are in normal condition a ground is extended from the armature and front contact of the MONB master off-normal relay 1512, through a down-check circuit of the call type translator including armatures and back contacts of the IN0 relay 1710, the CMUD relay 1711, thence through a down-check circuit of the chargeable time register 1628, a down-check circuit of the message unit register 1629, an armature and back contact of the ETRO elapsed time register up-check relay 1712, an armature and back contact of the BRO message unit register up-check relay 1713 to the winding of the CRR relay 1714 which by its operation reports the fact that the computer registers are properly released and ready for operation. The CRR relay operates its companion CRRA relay 1715 for purposes with which we are not at present concerned. The CRR relay 1714 extends a ground from the armature and front contact of the ST4B start relay 1510, over the front contact and armature of the CRR relay 1714 to cause the operation of the CRHD computer register hold relay 1716 which provides locking grounds for the message unit register, elapsed time register and type of call circuit. The CRHD relay 1716 locks through a back contact of the CRRL computer register release relay 1717 to the ground provided by the ST4B relay 1510. Therefore, at some later time when the CRRL relay 1717 is operated the CRHD hold relay 1716 is released and thereby releases the various registers of the computer.

The RCK relay 1718 is the release check relay for the adder and is operated by a circuit indicated by dotted lines and labeled adder down-check. The RCK relay extends the ground from the ST4B start relay to the winding of the LA—B relay 1719 which provides locking grounds for the adder. When the disconnect and answer times have been properly registered they are, as explained hereinbefore, immediately transmitted to the adder and as soon as the adder has completed its computation, an up-check circuit is established therein and a ground is extended over the ACK lead through the armature 1 and back contact of the 100 relay 1720 (which operates in response to a particular condition established when the elapsed time round-off translator 1721 reports an elapsed time exceeding the capacity of the computer, that is, 99 minutes) to operate the ACK adder check relay which reports that the sum derived is within the capacity of the computer and the call is, in that respect, regular.

The LA—B relay 1719 after operating to provide the locking grounds for the adder remains operated under the control of the RCK relay 1718, the CRRA relay 1715 and the BRO relay 1713. The RCK relay, of course, will release as soon as any registration is made in the adder and, therefore, opens the adder down-check circuit. The CRRA relay 1715 likewise releases when the computer register down-check circuit is opened, by way of example, through the operation of the MUT0 tens relay 1632. The circuit for the BRO relay 1713 is prepared by an up-check circuit extending through the call type translator and the message unit registers as indicated by the broken lines to the armature of the STA relay 1727 but is held open until this STA relay becomes operated. Therefore, the adder cannot be released and the disconnect and answer times lost until the output perforator start circuit is enabled. Looking at Fig. 18 which will be described in full hereinafter, it will be noted that the output of a detail call cannot be started until the first timing entry of the next call has been read, that is, the first reading interval of a call after a detail call such as the reading interval 7 is used to check for a repetition of a line having the A digit zero which would indicate an additional and unnecessary supplementary line. The fact that the line begins with a 1 thus indicating a timing entry and thus proving that this line is not an erroneously additional supplementary line enables the output start circuit, whereupon the STA relay 1727 will operate and close the circuit for the BRO relay 1713 thus opening the last of the circuits holding the LA—B relay 1719 operated. The LA—B relay, therefore, releases and unlocks the adder relays whereby the adder is dismissed and thus enabled to proceed with the computation of the elapsed time reported by the timing entries now being registered.

The path for operating the ADR relay 1626 has been hereinbefore described as originating in a ground at one of the message unit register relays. Another ground for enabling this circuit and thereby operating the ADR relay 1626 may be found in the operation of the SC short call relay 1728. The ACK relay 1726 is the adder check relay and actually reports the validity of the operation of the adder. The OCK relay 1729 reports the operation of the adder. When these two relays are both operated and the elapsed time tens round-off translator 1721 shows an elapsed time of less than 40 minutes, it is known that no message unit formula can translate this into over 99 minutes and, therefore, the circuit is established for the operation of the SC relay 1728 which grounds the same lead as grounded by one of the message unit register relays such, for instance, as the MUT0 relay 1632. By this means the ADR relay 1626 may be operated and the disconnect time and answer time registers dismissed immediately without waiting for the actual registration of the message units in the message unit register 1629. This is a time-saving expedient used to speed up the operation of the device.

Should the computation of the elapsed time prove to be over 99 minutes, then the elapsed time tens round-off translator 1721 would close a circuit for the 100 relay 1720 and a circuit would be established from the ACK ground, from the hour tens adder 1731, the armature 1 and front contact of the 100 relay 1720, or alternatively from the 99 ground in the hour tens adder 1731 and the armature 2 and back contact of the 100 relay 1720 when this relay is not operated, thence over an armature and back contact of the COTA cancel overtime relay 1722, back contact and armature of the DSDA discard relay 1723, armature and front contact of the CLB entry progress control relay 1724 operated on the first line of an initial entry to the winding of the OC over-capacity relay 1725. The straddle lock control SLKA relay 1732 will be operated at this time and will serve not only to lock in the OC relay 1725 but will extend a ground to the WO wipe-out relay 1730 which will completely open the circuit of the LA—B relay 1719 and dismiss the adder. This operation is performed because if the capacity of the computer is thus exceeded the details of the call will be reported on a straddle tape and it is not necessary to report the result of the computation in chargeable time or message units.

As another example of the dismissal of the adder, it may be noted that the IN0 index zero relay 1710 will also operate the WO relay 1730, This means that index zero indicates a discard test call, that is, one made by a maintenance operator and which is, therefore, not chargeable to the calling line number. In this case, the record in the adder is wiped out because it is not necessary to report either the chargeable time or the number of message units which might be computed.

It will thus be seen that as soon as the disconnect and answer times are registered the adder will proceed to calculate the elapsed time and the number of message units corresponding thereto and that at the earliest possible moment after it has appeared that the call is regular the holding circuits for the disconnect time register and the answer time register are opened so that these registers are dismissed and are ready for reoperation. The adder may be dismissed immediately after the message unit register has been properly operated if the call is a message unit call. If, however, it is a detail call the adder must be held at least until it has been determined that the proper number of lines in the initial entry have been entered which means practically that no more than the required number has been entered. Therefore, as soon as the next line after the last line of an initial entry is entered and it proves that the A digit thereof is a 1, the start circuit for the output perforators is enabled and the adder is dismissed.

In considering the sequence chart of Fig. 18 it will be remembered that there are two gates involved. One, the gate provided by the GT1 relay and the second, the gate provided by the GT2 relay.

The GT1 gate is normally open, that is, with the GT1 relay released the circuit is ready so that upon the reading of a timing entry the disconnect register connector relay will be operated and the first timing entry may be registered. This gate will remain open, that is, the GT1 relay will not be operated until the first line of the initial entry appears. Therefore, the gate remains open for the registration of the answer time. When the first line of the initial entry appears the GT1 relay is operated and then remains operated under the control of the ADDC answer and disconnect register's down-check relay so that not until these registers have been cleared and are ready to again receive answer and disconnect times will this gate be opened.

The GT2 gate relay likewise is normally open, that is, with the GT2 relay released the register connector relay for the first line of the initial entry may be operated. Thus, when the first line of an initial entry is read, the CLRA relay may be operated only if the GT2 relay is released. Upon the operation of the CLRA relay and the consequent entry of the first line of the initial entry the reader line count circuit will operate so that at the beginning of the first supplementary line of the initial entry whether it be the two-line initial entry of a message unit call or the four-line initial entry of a detail call, the L4B relay will be operated and, therefore, at the beginning of this second line of the initial entry the gate will be open for the entry of the calling line number which always appears in this line. Therefore, the NRA relay will be operated at the beginning of the second line of the initial entry and responsive thereto the gate will be closed, that is, the GT2 relay will respond to the operation of the NRA relay. The GT2 relay locks under control of the CLDC class register's downcheck relay and, therefore, this gate remains closed until the call has been entirely disposed of and all the registers, with the exception of the disconnect and answer time registers, have been restored to normal.

Fig. 18 now shows a series of one hundred and four reading intervals within which time, seventeen calls of various types are shown as being entered and sixteen of these are shown as being entirely disposed of.

The first call is entered during the reading intervals 1 to 6, inclusive, and includes in interval 1 the entry of the disconnect time, in interval 2 the entry of the answer time and in intervals 3, 4, 5 and 6 the entry of a four-line initial entry having to do with a detailed call. These six reading intervals are bracketed and carried by a broken line toward the right to another bracket entitled "Output," comprehending five reading intervals, Nos. 8 to 12, inclusive, during which a five-line output is perforated. It may be noted that each of these reading intervals has a numeral 0, 1 or 2 shown above it. This is the A digit of the line involved at that time.

Now it is shown that the first call is entered during intervals 1 to 6, inclusive, and entirely disposed of during intervals 8 to 12, inclusive. However, the disposition of the timing entries is made during intervals 3 to 6 and actually is complete at least before interval 3 has ended. Hence, long before interval 6, the disconnect and answer time registers are cleared and the GT1 gate has been opened. Therefore, in intervals 7 and 8 the disconnect and answer time entries of the next call are entered. In interval 9 as also in intervals 10, 11 and 12 the first line of the initial entry of this next call is read but since the GT2 gate is closed this reading is without effect. However, at the end of the 12th interval, the first call has been completely disposed of and, therefore, the registers involved are cleared so that at the beginning of the 13th interval the GT2 gate is opened and this first line of the initial entry is read. At the beginning of the 14th interval the disconnect and answer registers are restored and since the L4B relay has been operated the calling line number register is operated to receive the identification of the calling subscriber and the GT2 gate is closed. Therefore, during the reading of the other items in this call during intervals 15 and 16 the disconnect and answer registers are free and ready to receive another registration. Therefore, during the 17th reading interval a check is made first for the repetition of another supplementary line of an initial entry which would begin with a zero and when it appears that this line is regular in all aspects, that is, it is a timing entry beginning with a 1 in the A digit, then the disconnect timing register connector relay is operated and this disconnect time is registered. During the 18th interval the answer time is registered and in the 19th interval the first line of the initial entry appears. However, the output of the second call takes place during the 18th to the 22nd intervals and, therefore, the first line of the initial entry of this 3rd call is read during the 19th, 20th, 21st and 22nd intervals. Again, when this second call has been entirely disposed of the GT2 gate is opened and in the 23rd interval this first line of the initial entry of this third call is registered.

It is believed that it is unnecessary to explain all of these operations in detail for the remaining calls. However, several interesting points may be noted. The fourth call entered during the 27th to the 34th intervals is a message unit call and is entirely disposed of by the end of the 36th interval. The timing entries of the fifth call are entered during the 35th and 36th intervals and, therefore, during the 37th interval the first line of the initial entry of this fifth call may be immediately entered so that there is no delay in this respect. The fourth, fifth, sixth and seventh calls are message unit calls, the first three of which prove to have a number of message units which can only be expressed in two digits and, therefore, the output of these in each case is a two-line output. The seventh call entered during intervals 43 to 46, inclusive, proves to have a number of message units which may be expressed by a single digit and, therefore, the output is a one-line output made during the 47th interval so that the eighth call is entered during the 47 to 50 reading intervals, the previous call having been entirely cleared at the end of the 47th interval so that no delay is entailed.

After the eighth call an hour entry is shown. This hour entry is delayed one interval due to the fact that the eighth call, a one-line output entry, is not disposed of until the 51st interval so that the hour entry is made in the 52nd interval. The ninth call thus finds both gates open and the four lines of this message unit call are entered during the intervals 53 to 56 inclusive, and are again disposed of by the end of the 58th interval so that during the 57th and 58th intervals the timing entries of the next call are entered and the initial entry follows during intervals 59 and 60 without delay.

The information read during the intervals 75 to 78, inclusive, appears to be only a two-line initial entry and is not preceded by any timing entries. This means that while some customer has made a call and, therefore, established by the use of his instrument the data for the initial entry, nevertheless the called partly has not answered because there is no answer time entry nor any disconnect time entry. The call is thus a don't answer or busy call and is disposed of immediately so that the next call in intervals 79 to 82, inclusive, may be immediately read into the registers.

The call read into the registers during intervals 83 to 88, inclusive, appears to be a message unit detail call, that is, one in which the customer charge will be made in message units and a record of the details will also be made for other purposes. Although the call is entered in the regular manner and the message unit charge is completely calculated and registered on the message unit output tape during interval 90 so that otherwise the next call could be read off immediately, the output lines for the detail part of this call are only made in intervals 92 to 96, inclusive. Hence, the reading-in of the next call is delayed for six intervals, 91 to 96, inclusive, and the first line of the initial entry thereof is only actually registered in the 97th interval.

There are many variations of this pattern but the examples given in Fig. 18 will suffice to show the overlapping operation.

What is claimed is:

1. In an automatic accounting system wherein coded records are processed by various types of electrical devices to produce customer bills in a number of steps from records automatically produced by customer uses of given facilities over variable time periods, said records being in the form of perforated tapes, each said device producing one or more new tapes from the records on an old tape as modified by that step in the accounting process for which the particular device is designed, each said tape containing items of specific information pertaining to individual customer uses of the given facilities and items of general information common to many uses of the facilities by many different customers at different times, one of said processing devices being a computer, provided with a plurality of registers, some for registering specific items of information from an old tape and others for registering specific items of information derived by said computer from registered items of information, means for calculating elapsed time from registered items of information, means for releasing the said registers in which said items of information are registered from which said elapsed time is calculated, means responsive to the release of said registers for reading into said registers items of information pertaining to a new call before final disposition of all other registered items of information pertaining to the call whose said elapsed time has been calculated, a supervisory circuit for controlling the said releasing means, a customer charge unit formulating means jointly controlled by said elapsed time calculating means and another specific item of information (billing index) read from said old tape and registered in one of said registers, means in said supervisory circuit responsive to calculated elapsed time or formulated customer charge units exceeding values which may be expressed in two digits for causing the final disposition of a call to be shifted from one to another of the means for producing the said new tapes, and a (short call) relay responsive to a calculated elapsed time of a given maximum value for controlling said releasing means, whereby said releasing means may be operated prior to the said formulation of said customer charge units and said registers may be released at an earlier than normal time.

2. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of information into customer charges and to issue said charges in billable form, said computer including a calculator for calculating elapsed time from items of specific information read from an incoming tape, means thereafter responsive to another item of specific information read from the said incoming tape for transforming said calculated elapsed time to a customer charge, supervisory means responsive to both elapsed time and to customer charges either or both of which exceed a number which may be expressed in two digits for diverting the output of the said computer from one of said outgoing tapes to another of said outgoing tapes and a special relay for dismissing said supervisory circuit responsive to an elapsed time calculation up to but not exceeding a predetermined maximum value, whereby such value combined with said other item of specific information for transforming calculated elapsed time to customer charges which would produce maximum charges would not produce a charge expressed in more than two digits.

3. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, a plurality of recorders for recording customer charges derived from said registered information, sorting means responsive to said registered information for selecting one of said recorders for each said derived customer charge and a plurality of pattern forming means for deriving from said registered information the information necessary for each output item of information to be recorded by said selected recorder.

4. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, a multi-contact relay device for extending locking grounds to certain of said registers employed to supply information to said calculator, means for dismissing said registers and clearing them for the registration of similar items of information pertaining to a subsequent customer charge while the remaining items of information for a first customer charge are being registered in other of said registers, said dismissing means including means for releasing said multicontact relay device, a plurality of recorders for recording customer charges derived from said registered information, sorting means responsive to said registered information for selecting one of said recorders for each said derived customer charge and a plurality of pattern forming means for deriving from said registered information the information necessary for each output item of information to be recorded by said selected recorder.

5. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, a multicontact relay device for extending locking grounds to certain of said registers employed to supply information to said calculator, means for dismissing said registers and clearing them for the registration of similar items of information pertaining to a subsequent customer charge while the remaining items of information for a first customer charge are being registered in other of said registers, said dismissing means including means for releasing said multicontact relay device, said device consisting of a plurality of multicontact relays, a separate ground source for operating each of said relays and a locking path for each said relay controlled by another of said relays, a plurality of recorders for recording customer charges derived from said registered information, sorting means responsive to said registered information for selecting one of said recorders for each said derived customer charge and a plurality of pattern forming means for deriving from said registered information the information necessary for each output item of information to be recorded by said selected recorder.

6. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, a multicontact relay device for extending locking grounds to certain of said registers employed to supply information to said calculator, means for dismissing said registers and clearing them for the registration of similar items of information pertaining to a subsequent customer charge while the remaining items of information for a first customer charge are being registered in other of said registers, said dismissing means including means controlled normally by a result means of said calculator and alternatively by a short call relay responsive to a calculation by said calculator prior to the registration of the result in said result means, and an up-check circuit of another of said registers employed for registering an item of information normally following the said items constituting the data for calculation for releasing said multicontact relay device, a plurality of recorders for recording customer charges derived from said registered information, sorting means responsive to said registered information for selecting one of said recorders for each said derived customer charge and a plurality of pattern forming means for deriving from said registered information the information necessary for each output item of information to be recorded by said selected recorder.

7. In an automatic accounting system of the type wherein coded records are processed by various types of electrical devices to produce customer bills in a number of steps from perforated tape records automatically produced by customer uses of given facilities over variable time periods, each said device producing one or more new or output tapes from the records on an old or input tape as modified by that step in the accounting process for which the particular said device is designed, each of said tapes containing items of specific information pertaining to individual customer uses of the given facilities and items of general information common to many uses of the facilities by many different customers at different times, each of said items of information consisting of one or more coded records, one of said devices being a computer for deriving customer charges from items of common information and items of specific information in an incoming tape and for recording computed customer charges on outgoing tapes, said computer including a calculator for deriving elapsed time charges from certain specific items of information, means for sequentially reading a series of specific items of information for one customer charge from an incoming tape, means for entering the first of these into the said calculator and means for storing the remainder until full information for perforation on an outgoing tape has been accumulated, means for storing the result derived by the said calculator and means responsive thereto for clearing the said calculator for the entry of other items of specific information for another customer charge whereby overlapping operation consisting of the entry of items for another processing may be started before the processing of a prior charge has been completed, means for delaying the entry of new items of specific information into said calculator after said calculator has been cleared until it is assured that the last item of a previously registered call has been properly registered, said last means consisting of a counting means for counting a predetermined number of coded records and a testing means for determining the nature of the next succeeding coded record read off said incoming tape after said counting means has counted exactly said predetermined number, means for differentiating between the data for incoming charges of different nature, said delaying means being responsive to said differentiating means whereby in the processing of customer charges of one nature the said overlapping operations may be allowed to take place as soon as the said calculator has completed its operations and that data for a charge has been read from said incoming tape whereas in the processing of customer charges of another nature the said overlapping operations may be delayed for the purposes set forth.

ERLON W. FLINT.
ALFRED E. HAGUE.
AMOS E. JOEL, JR.
ROBERT O. RIPPERE.

REFERENCES CITED

The following references are of record in the file of this patent:

UNITED STATES PATENTS

| Number | Name | Date |
| --- | --- | --- |
| 2,165,925 | Goodrum et al. | July 11, 1939 |
| 2,178,064 | Bryce | Oct. 31, 1939 |
| 2,237,136 | Dickinson | Apr. 1, 1941 |
| 2,268,203 | Carpenter et al. | Dec. 30, 1941 |